United States Patent [19]

Taki et al.

[11] Patent Number: 5,089,358

[45] Date of Patent: Feb. 18, 1992

[54] OPTICAL RECORDING MEDIUM

[75] Inventors: Kazunari Taki, Nagoya; Hideo Maruyama, Kuwana; Yumiko Ohashi, Hajima; Riki Matsuda, Nagoya, all of Japan

[73] Assignee: Brother Kogyo Kabushiki Kaisha, Aichi, Japan

[21] Appl. No.: 432,457

[22] Filed: Nov. 6, 1989

[30] Foreign Application Priority Data

| Nov. 5, 1988 | [JP] | Japan | 63-279910 |
| Jul. 5, 1989 | [JP] | Japan | 1-173751 |
| Jul. 5, 1989 | [JP] | Japan | 1-173752 |
| Jul. 5, 1989 | [JP] | Japan | 1-173753 |
| Jul. 5, 1989 | [JP] | Japan | 1-173754 |
| Jul. 6, 1989 | [JP] | Japan | 1-174776 |
| Aug. 18, 1989 | [JP] | Japan | 1-213276 |

[51] Int. Cl.$^5$ .............................................. B32B 5/66
[52] U.S. Cl. .......................... 428/694; 369/275.1; 369/279; 369/283; 428/900
[58] Field of Search ............... 369/275.1, 275.2, 283, 369/284, 286, 288, 277, 279, 275.5; 428/694, 900

[56] References Cited

U.S. PATENT DOCUMENTS

| 4,587,533 | 5/1986 | Nakane et al. | 369/275.1 |
| 4,600,682 | 7/1986 | Spong et al. | 369/284 |
| 4,617,601 | 10/1986 | Tanaka | 369/275.2 |
| 4,839,883 | 6/1989 | Nagata et al. | 369/283 |
| 4,860,273 | 8/1989 | Sawano et al. | 369/275.1 |
| 4,927,681 | 5/1990 | Chikuma | 369/288 |
| 4,965,153 | 10/1990 | Imataki et al. | 369/277 |
| 4,980,875 | 12/1990 | Ishiwata et al. | 369/275.2 |

Primary Examiner—Merrell C. Cashion, Jr.
Assistant Examiner—Robert J. Follett
Attorney, Agent, or Firm—Oliff & Berridge

[57] ABSTRACT

An optical recording disk comprises a base plate, a flat layer, an optical recording layer and a protection layer which are laminated in this order. The flat layer has a flat surface which contacts with the optical recording layer to thereby enable the optical recording layer to have a uniform thickness over the layer and make the surface of the optical recording layer flat. At least one of the other layers constituting the above optical disk other than the optical recording layer comprises a material capable of recording and reproducing information, such as a magnetooptic material, a phase-change material, an organic pigment and a pit-formable material in which the information is recordable.

48 Claims, 10 Drawing Sheets

OPTICAL RECORDING MEDIUM

BACKGROUND OF THE INVENTION

This invention relates to an optical recording medium such as an optical disk on which information is recorded and from which the information is reproduced by irradiating a laser beam thereto, and more particularly to an optical recording medium including an optical recording layer having a substantially flat thickness and a substantially flat surface over the layer.

An optical disk has been conventionally known as a recording medium. In such a conventional optical disk, information is recorded on an optical recording layer formed in the optical disk by locally irradiating a light beam to the optical recording layer to heat the irradiated portion of the layer and change a physical property such as a magnetization direction, a phase state, an absorption spectrum or the like in the irradiated portion of the layer, and the information is reproduced from the optical disk by detecting the rotation of the polarization plane of a light beam reflected from the optical recording layer (that is, Kerr effect), the rotation of the polarization plane of the light beam passing through the optical recording layer (Faraday effect), or the change of intensity of the reflected light beam. In this case, a magnetooptic material, a phase-change material, an organic pigment, a pit-formable material or the like is used for the optical recording layer of the optical disk. Further, the optical disk comprises a base plate having projections or grooves (that is, irregularity) formed spirally or coaxially on the surface thereof which are used for defining tracks, an interference layer or protection layer, the optical recording layer as described above and a protection layer which are laminated in this order. Each of those layers of the conventional optical disk has the sectional profile corresponding to the irregularity of the surface of the base plate which is caused by the projections or grooves.

FIG. 1 is a cross sectional view of a conventional optical disk in which a magnetooptic material is used for the optical recording layer. The conventional optical disk comprises a disk base plate 12' having projections 12a' (irregularity) formed spirally or coaxially on the surface thereof, an interference layer 14', a magnetooptic recording layer 16' and a protection layer 18'. The interference layer 14' and the protection layer 18' are formed by the thin film forming method such as a sputtering method, a vacuum deposition method or the like. As shown in FIG. 1, the magnetooptic recording layer 16' is formed on the base plate such that the layer 16' has substantially the same sectional profile as that of the irregularity of the surface of the base plate, that is, the recording layer itself has an uneven surface, so that it is difficult to obtain perpendicular magnetic anisotropy uniformly over the recording layer because the thickness of the recording layer is not constant over the layer and the direction of the magnetization is different between stepped portions and flat portions of the surface of the recording layer. This causes a recording characteristic of the optical disk to be unstable. As a result, the shape of bits (elements constituting information in the recording layer, for example, pits) is ununiform and a signal-to-noise ratio (S/N) is reduced.

Similarly in the optical disk as described above, a conventional optical disk, in which a phase-change material is used for an optical recording layer and the surface of the recording layer is rough, also has disadvantages that the thickness of the recording layer is not constant over the layer and crystallization is deteriorated between stepped portions and flat portions of the surface of the recording layer, so that an uniform reflectivity or transmissivity for an incident light is not obtained. This causes noise components to be increased and the recording characteristic of the optical disk to be degraded. Moreover, the recording layer is liable to be oxidized and deteriorated at the stepped portions, and therefore, the optical disk having such an optical recording layer has a low reliability for employment for a long time.

Still further, in the conventional optical disk as described above, only the optical recording layer is used for recording and reproducing information, so that the memory capacity of the optical disk is limited. Such a conventional optical disk can not satisfy a requirement for increasing the memory capacity of the optical disk, which has been made larger in the art as the demand for optical disks is increased.

Still further, in the conventional optical layer, thickness of the protection layer is set to be about $\lambda/4$ where $\lambda$ is a wavelength of light in a medium and the thickness of the optical recording layer is set to a predetermined value so that the reflectivity for the light is substantially minimum in order to enhance a Kerr effect, so that the intensity of a diffracted light from the reflection layer for a tracking operation is reduced. This causes a tracking servo for the optical disk to be unstable and a stable reproduction is not performed.

SUMMARY OF THE INVENTION

An object of this invention is to provide an optical disk having an excellent recording characteristic and a high quality.

Another object of this invention is to provide an optical disk in which information can be recorded and reproduced not only in an optical recording layer of the optical disk but also in other layers of the optical disk than the optical recording layer, to thereby increase the memory capacity of the optical disk.

According to one aspect of this invention for attaining the above objects, the optical disk comprises a base plate, a flat layer, an optical recording layer and a protection layer which are laminated in this order, the flat layer having a substantially flat surface which contacts with the optical recording layer to thereby enable the optical recording layer to have a substantially uniform thickness and a substantially flat surface over the layer.

According to another aspect of this invention for attaining the above objects, at least one of the other layers constituting the above optical disk other than the optical recording layer comprises a recordable and reproducible material.

DETAILED DESCRIPTION OF THE INVENTION

The preferred embodiments of this invention will be described hereunder with reference to the accompanying drawings. In the following embodiments, a magnetooptic material or a phase-change material is representatively used for an optical recording layer in an optical disk. However, the optical recording layer of this invention is not limited to those materials. Any material may be used for the optical recording layer insofar as information is recorded therein and reproduced therefrom by a physical method such as irradiation of a light beam or the like. For example, a pit-formable recording material such as Te, Bi or the like may be used for the optical recording layer. Further, in the following embodiments, an optical disk is representatively used as an optical recording medium. However, the shape of the optical recording medium is not limited. For example, it may be of a card type.

Figure 2:
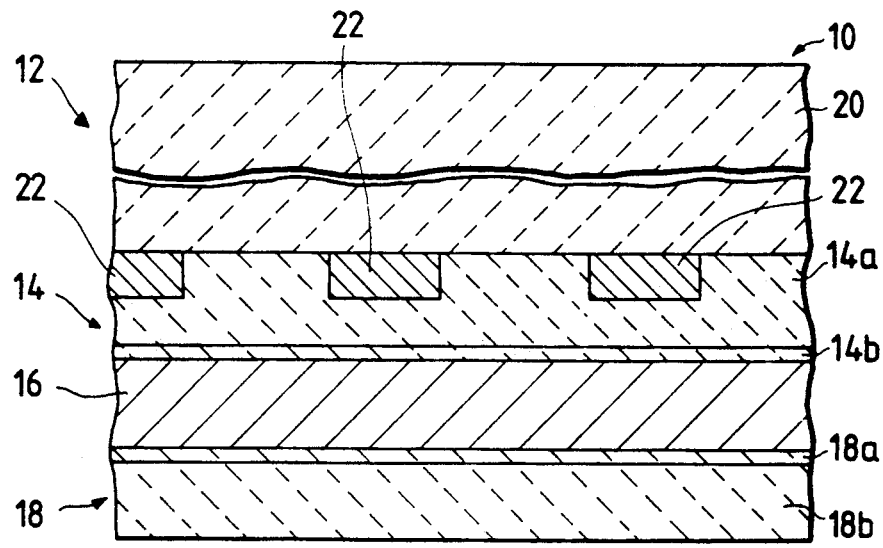
FIG. 2 is a cross sectional view of first and second embodiments of the optical disk according to this invention.

FIG. 2 is a cross sectional view of a first embodiment of the optical disk according to this invention. In this embodiment, the magnetooptic material is used for the optical recording layer. Accordingly, the optical disk of this embodiment is hereunder referred to as a magnetooptic disk.

As shown in FIG. 2, the magnetooptic disk of this embodiment comprises a base plate 12, a flat layer 14, a magnetooptic recording layer 16 and a protection layer 18 which are laminated in this order.

Figure 3A:
FIGS. 3(A) to 3(E) are diagrams for explaining a process for producing a disk base used in the optical disk as shown in FIG. 2.
Figure 3B:
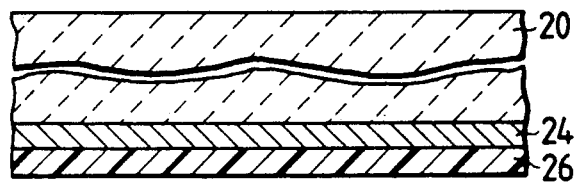
Figure 3C:
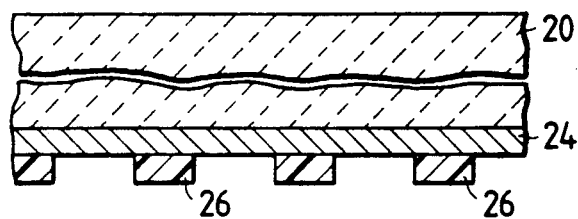
Figure 3D:
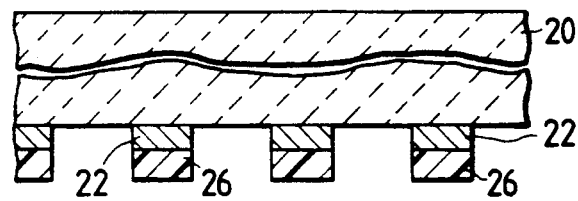
Figure 3E:
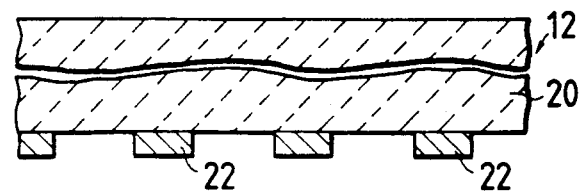

The base plate 12 comprises a glass plate 20 and a metal reflection layer 22 of Al, Ta or the like which is fixedly provided on the surface of the disk base plate 12 in the spiral or coaxial form. A method for producing the disk base plate 12, that is, a method for providing the reflection layer 22 on the glass plate 20 is shown in FIGS. 3(A) to 3(E). At a first stage, as shown in FIG. 3(B), a metal film 24 used for the reflection layer 22 is formed on one surface of the glass plate 20 shown in FIG. 3(A) by a sputtering method, a vacuum deposition method or the like, and then a photoresist 26 is coated on the metal film 24 by a spin coating method or the like. At a second stage, the photoresist 26 is partially removed from the glass plate 20 by a laser beam exposing method or the like so that the remaing portion of the photoresist 26 is in the spiral or coaxial form as shown in FIG. 3(C), and then the metal film 24 is subjected to an etching treatment utilizing acid and alkali solutions or a plasma etching treatment to be partially removed from a portion of the surface of the glass plate 20 at which the photoresist is removed. As a result, the metal film 24 having the same form as the remaining photoresist 26 is provided as a reflection layer 22 on the glass plate 20 as shown in FIG. 3(D). At a final stage, the remaining photoresist 26 on the remaining metal film 24 is removed by an organic material or the like and a disk base plate 12 shown in FIG. 3(E) is formed. The reflection layer 22 which is spirally or coaxially formed on the glass plate 20 serves to reflect a laser beam passing through the glass plate 20, and therefore is used to define tracks for recording information.

The flat layer 14 formed on the base plate 12 according to this embodiment comprises a chemically-stable and transparent oxide such as $SiO_2$ or the like and has various functions. For example, the flat layer 14 serves as a protection layer for protecting the magnetooptic recording layer 16 from chemical change, as an interference layer for increasing the Kerr rotation angle of a light beam reflected from the magnetooptic recording layer 16 and extinguishing light beams reflected from both surfaces of the magnetooptic recording layer 16 by interference of the light beams, and as a flat layer for making the magnetooptic recording layer 16 substantially flat. As shown in FIG. 2, the flat layer 14 of this embodiment comprises a first layer 14a and a second layer 14b. The first layer 14a is formed by the spin coating method in which an oxide comprising liquefied glass is coated on the base plate 12 while the base plate 12 is rotated with the reflection layer 22 placed face up, and then is solidified by a bake of high temperature about 400° C. In this method, gaps between the projections of the reflection layer 22 are filled with the oxide, and the surface of the first layer 14a which is disposed at the opposite side to the base plate 12, that is, which confronts the magnetooptic recording layer becomes substantially flat irrespective of the irregularity of the surface of the disk base plate 12. Further, the second layer 14b comprises the same material as the first layer 14a and is formed on the first layer 14a by a physical thin film forming method such as a sputtering or vacuum deposition method, or a chemical thin film forming method such as a chemical vapor deposition method (CVD). The second layer 14b is used for adjusting the thickness of the flat layer 14 to be a predetermined value. If only the spin coating method enables the thickness of the flat layer 14 to be the predetermined value, the second layer 14b is not necessary to be formed on the first layer 14a.

The magnetooptic recording layer 16 is formed of a magnetooptic material of amorphous alloy consisting substantially of rare earth metal and transition metal such as TeFeCo, GdTbFe or the like by the sputtering, vacuum deposition or other well known methods. The thickness of the magnetooptic recording layer is preferably below 0.1 μm, but it is not limited thereto. In the magnetooptic disk thus constructed, the magnetooptic recording layer can be flatly formed on the base plate such that the thickness thereof is substantially uniform over the layer because the surface of the flat layer 14 which confronts the magnetooptic recording layer 16 is substantially flat.

The protection layer 18 is used for protecting the magnetooptic recording layer 16 from chemical change and improving a reflection effect, for example increasing the Kerr rotation angle. The protection layer 18 is also formed of the same material of the flat layer 14, that is, chemically stable and transparent oxide such as SiO, $SiO_2$, AlN or the like. Further, the protection layer 18 comprises a first layer 18a and a second layer 18b. The first layer 18a is formed by the physical thin film forming method such as sputtering, vacuum deposition or other methods, or the chemical thin film forming method such as the CVD. The second layer 18b comprising the same material as the first layer 18a is coated on the first layer 18a by the spin coating method, and then is solidified with the bake of high temperature. The second layer 18b is used for adjusting the thickness of the protection layer 18 to be a predetermined value. The thickness of the protection layer 18 is preferably below 1 μm. Similarly in the flat layer, if only the spin coating method enables the thickness of the protection to be the predetermined value, the second layer 18b is not necessary to be formed on the first layer 18a.

In the process for producing the magnetooptic disk, the second layer 14b of the flat layer 14, the magnetooptic recording layer 16 and the first layer 18a of the protection layer 18 can be successively formed without taking the magnetooptic disk out of a vacuum chamber each time one of the layers is formed.

In the magnetooptic disk thus constructed, the recording of information in the magnetooptic recording layer 16 is performed by locally heating the recording layer 16 to increase the temperature of the heated portion of the recording layer 16 to the Curie point (temperature) with irradiation of a laser beam and by adjusting the direction of an external magnetic field to be applied to the recording layer 16 and orienting the magnetization direction of the heated portion to a desired direction when the heated portion of the recording layer 16 is cooled, thereby to record the information corresponding to the magnetization direction in the recording layer 16. Further, the reproduction of the information from the recording layer 16 is performed by applying a laser beam through the disk base plate 12 to the recording layer 16 in which the information has been recorded. In this case, the Kerr rotation angle of the laser beam reflected from the magnetooptic recording layer 16 is changed in accordance with the local change of magnetization direction due to a magnetooptic effect, and the information recorded in the recording layer 16 is read out by detecting the change of the Kerr rotation angle.

In the magnetooptic disk of this embodiment, the magnetooptic recording layer 16 has the substantially uniform thickness and the substantially flat surface over the layer, so that the perpendicular magnetic anisotropy is uniformly obtained over the recording layer 16. As a result, a stable recording characteristic is obtained in the magnetooptic disk. Therefore, the magnetooptic disk of this embodiment has more excellent recording characteristics than the conventional magnetooptic disk.

Further, in the magnetooptic disk of this invention, the reflection layer 22 for defining the tracks are formed in the disk, so that a tracking operation is performed by a well-known push-pull method, a three-beam method or the like.

Still further, in the process for producing the magnetooptic disk of this embodiment, the second layer 14b of the flat layer 14, the first layer 18a of the protection layer 18 and the magnetooptic recording layer 16 sandwiched between the second layer 14b and the first layer 18a are successively formed without taking the magnetooptic disk out of the vacuum chamber when each layer is formed, so that the chemical change such as an oxidation reaction of the magnetooptic recording layer 16 is sufficiently prevented and the magnetooptic disk having the magnetooptic recording layer is efficiently produced.

The structure of the magnetooptic disk of this invention is not limited to that of this embodiment as described above. Any modification may be made to the constituting elements of the magnetooptic disk as described above. For example, the following modifications may be made to this embodiment.

In this embodiment, the base plate 12 comprises the glass plate 20 and the reflection layer 22. In place of provision of the reflection layer 22 on the glass plate 20, projections or grooves for reflecting an incident laser beam may be formed on or in the glass plate 20. Further, in place of the glass plate 20, synthetic resin such as acrylic resin, polycarbonate resin, polyolefin resin or the like may be used for the base plate.

Further, in the embodiment as described above, the reflection layer 22 comprises metal. However, any material other than metal such as nitride or the like may be used for the reflection layer 22.

Still further, in the embodiment as described above each of the flat layer 14 and the protection layer 18 comprises two layers (first and second layers). However, each layer may comprise a single layer by a single thin film forming method, or comprise three or more layers by plural thin film forming methods. The materials used for the flat layer and the protection layer may be freely changed as occasion demands.

Still further, any modifications may be made to the method for producing the magnetooptic disk as described above insofar as no sharp irregularity (unevenness) is formed at the surface of the flat layer 14 to be contacted with the magnetooptic recording layer 16 and the magnetooptic recording layer has the substantially uniform thickness and the substantially flat surface.

Still further, in the embodiment as described above the laser beam is applied to the magnetooptic recording layer through the base plate 12. However, this embodiment is applied to an optical disk in which a laser beam is applied to a recording layer from the opposite side to a base plate. In this case, the optical disk comprises a base plate, a protection layer formed on the base plate for protecting a magnetooptic recording layer from chemical change and improving a reflection effect such as increase of Kerr rotation angle, a magnetooptic recording layer formed on the protection layer, and a flat layer formed on the recording layer and serving as both of a protection layer and an interference layer for protecting the recording layer from the chemical change, increasing the Kerr rotation angle of the reflected light beam from the recording layer and extinguishing the reflected light beams from both of the surfaces of the recording layer by interference of the light beams. Further, the flat layer which is formed on the recording layer may be provided with irregularity (unevenness) for defining tracks. Accordingly, the irregularity (projections) is not necessarily formed on the disk base. The detailed description of this type of optical disk will be described later.

Still further, in this embodiment, those parts of the flat layer 14 and the protection layer 18 which are contacted with the magnetooptic recording layer 16 are formed by the physical or chemical thin film forming method, and the other parts of the flat and protection layers 14 and 18 which are apart from the recording layer 16 are formed by the spin coating method. The above processes are applied to not only the method for producing the optical disk according to this invention in which the recording layer is provided with a flat surface, but also the method for producing the conventional optical disk in which the recording layer is provided with an uneven surface in accordance with the irregularity of the surface of the disk base.

In a case where a phase-change material is used for the optical recording layer in place of the magnetooptic material, all of the processes for producing the optical disk including the magnetooptic recording layer as described above can be applied to a method for producing an optical disk including a phase-variation type recording layer, except for the processes for forming the optical recording layer and the flat layer. A base plate and a protection layer can be formed in the same processes as the first embodiment, and therefore the detailed description thereof is eliminated.

Like the first embodiment as shown in FIG. 2, the flat layer 14 of this embodiment serves to protect the phase-variation type recording layer 16 from chemical change and extinguish the reflected light beams from both surfaces of the flat layer 14 by interference of the light beams to thereby improve a recording sensitivity. The flat layer 14 of this embodiment comprises two layers of a chemically-stable and transparent oxide such as $SiO_2$ or the like, and is formed as follows.

Like the first embodiment, a first layer 14a of the flat layer 14 is formed by the spin coating method in which alkoxide including Si or the like is coated on the base plate including the reflection layer 22 and glass plate 20 while the base plate 12 is rotated with the reflection layer 22 placed face up, and then is solidified by a bake of high temperature about 400° C. In this method, gaps between projections of the reflection layer 22 are filled with the oxide, and the surface of the first layer 14a' which confronts the phase-variation type recording layer becomes substantially flat irrespective of the irregularity of the surface of the base plate. Further, the second layer 14b comprises the same material as the first layer and is formed on the first layer 14a by the physical thin film forming method such as the sputtering or vacuum deposition method, or the chemical thin film forming method such as the chemical vapor deposition method (CVD). The second layer 14b is used for adjusting the thickness of the flat layer 14 to be a predetermined value. If only the spin coating method enables the thickness of the flat layer 14 to be the predetermined value, the second layer 14b is not necessary to be formed on the first layer 14a.

The phase-variation type recording layer 16 is formed on the flat layer 14 by the sputtering or vacuum deposition materials including mainly In-Se or the materials including mainly TeOx. The thickness of the recording layer 16 is preferably below 0.1 $\mu$m. The phase-variation type recording layer 16 has the substantially uniform thickness over the layer and the surface thereof is substantially flat because the surface of the flat layer 14 which confronts the recording layer 16 is substantially flat.

When a laser beam is applied through the base plate 12 to the phase-variation type recording layer 16 in the phase-variation type optical disk thus constructed, the phase-variation type recording layer is reversibly or irreversibly changed from an amorphous state to a crystalline state. Accordingly, the recording of the information in the phase-variation type recording layer 16 is performed by irradiating the laser beam to the recording layer 16 to bring about the phase variation in the irradiated portion of the recording layer. Further, the reproduction of the information from the recording layer 16 is performed by detecting the change in reflectivity or transmissivity of the recording layer to the laser beam, which is caused by the phase variation as described above.

The phase-variation type optical disk thus constructed has advantages that information can be overwritten in the phase-variation type recording layer 16, a ratio of carrier to noise (C/N) is higher and the structure of an optical head is simple. Further, the phase-variation type recording layer 16 has the substantially uniform thickness and the substantially flat surface over the layer, and therefore stable reflection and transmissivity characteristics are obtained. As a result, the phase-variation type optical disk according to this embodiment also has a sufficiently excellent recording characteristic like the first embodiment.

Like the first embodiment, in the process for producing the phase-variation type recording disk of this embodiment, the second layer 14b of the flat layer 14, the first layer 18a of the protection layer 18 and the phase-variation type recording layer 16 sandwiched between the second layer 14b and the first layer 18a are successively formed without taking the phase-variation type optical disk out of the vacuum chamber as each layer is formed, so that the chemical change of the phase-variation type recording layer 16 is sufficiently prevented and the phase-variation type optical disk is efficiently produced.

Further, like the first embodiment, in the phase-variation type optical disk of this embodiment, the reflection layer 22 for defining the tracks are formed in the disk, so that a tracking operation is performed by a well-known push-pull method, a three-beam method or the like.

Still further, the flat layer 14 may be formed in a sol-gel method by utilizing as a starting material a metal organic compound such as metal alkoxide, metal acetylacetate, metal carboxylate or the like, and a metal inorganic compound such as nitrate, oxychloride, chloride or the like.

The same modifications to the base plate, the protection layer, the reflection layer and the method for producing the optical disk as made in the first embodiment may be made to this embodiment.

Figure 4:
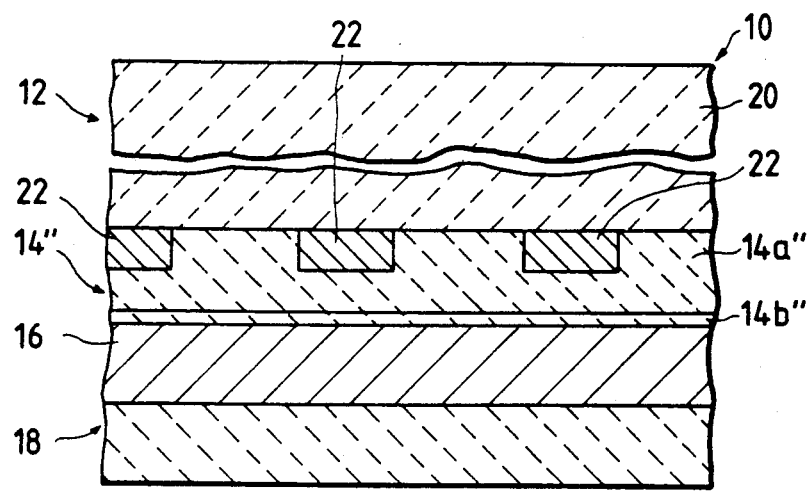
FIG. 4 is a cross sectional view of a third embodiment of the optical disk according to this invention.

FIG. 4 is a cross sectional view of a third embodiment of the optical disk according to this invention.

The basic structure of the optical disk of this embodiment is substantially similar to that of the first embodiment. Further, in this embodiment, a magnetooptic material is representatively used for the optical recording layer. However, the material of the recording layer of this embodiment is not limited thereto. For example, a phase-change materials such as a pit-formable material or the like may be used. Still further, the flat layer comprises a different material from those of the first and second embodiments. This difference causes a large difference in memory capacity between the optical disks of the both of the first and second embodiments and the optical disk of the third embodiment. Further, in this embodiment the protection layer 18 is formed on the recording layer 16 by a single method, and therefore the layer 18 comprises a single layer, unlike the first embodiment. However, the protection layer 18 may comprise two or more layers like the first embodiment. In the optical disk of this embodiment, the same elements as those in FIG. 2 are designated by the same numerals.

The method of producing an optical disk of this embodiment is substantially similar to those of the first and second embodiments, except for the process for forming the flat layer.

That is, the disk base plate comprising a glass base plate 20 and a metal reflection layer 22 of Al or the like is formed in the same processes as shown in FIGS. 3(A) to 3(E). Thereafter, the glass plate 20 and the reflection layer 22 are coated with an organic pigment solution comprising spiropyran and fulgide compound dissolved in a solvent by the spin coating method while the base plate 12 is rotated with the reflection layer 22 placed face up, and then the base plate coated with the organic pigment is left alone or heated to solidify the organic pigment, thereby forming a first layer 14a" of the flat layer 14". In this process, gaps between the reflection layers (projections) 22 are filled with the organic pigment, and the surface of the first layer 14a" to be contacted with the recording layer 16 is substantially flat irrespective of the irregularity of the surface of the disk base plate 12. Further, a second layer 14b comprising a thin film of $SiO_2$, SiO, AlN or the like is formed on the first layer 14a by the physical thin film forming method such as the sputtering, vacuum deposition or other methods, or the chemical thin film forming method such as the CVD or the like. As described above, like the first embodiment, the flat layer of this embodiment comprises two layers. The second layer 14b" is used for adjusting the thickness of the flat layer 14" to be a predetermined value.

The magnetooptic recording layer 16 is also formed on the flat layer 14" in the same process as the first embodiment, and the detailed descriptions of the material and the process for forming the recording layer are eliminated.

In this embodiment, unlike the first embodiment, the protection layer 18 comprises a single layer. This protection layer 18 is formed of a chemically-stable and transparent compound such as $SiO_2$ or the like by the physical thin film forming method such as the sputtering, vacuum deposition or other methods, or the chemical thin film forming method such as the CVD or the like. The thickness of the protection layer is preferably below 1 $\mu$m.

Like the first embodiment, the second layer 14b" of the flat layer 14', the magnetooptic recording layer 16 and the protection layer 18 are successively formed without taking the magnetooptic disk out of a vacuum chamber after each layer is formed.

In the magnetooptic disk 10 thus constructed, the recording of information in the magnetooptic recording layer 16 is performed by locally heating the recording layer 16 to increase the temperature of the heated portion of the recording layer 16 to the Curie point (temperature) with irradiation of a laser beam and by adjusting the direction of an external magnetic field to be applied to the recording layer 16 and orienting the magnetization direction of the heated portion to a desired direction when the heated portion of the recording layer 16 is cooled, thereby to record the information corresponding to the magnetization direction in the recording layer 16. Further, the reproduction of the information from the recording layer 16 is performed by applying a laser beam, for example, having a wavelength of 8300 Å through the base plate 12 to the recording layer 16 in which the information is recorded. In this case, the Kerr rotation angle of the laser beam reflected from the magnetooptic recording layer 16 is changed in accordance with the local change of the magnetization direction due to a magnetooptic effect, and the information recorded in the recording layer 16 is read out by detecting the change of the Kerr rotation angle.

Figure 5A:
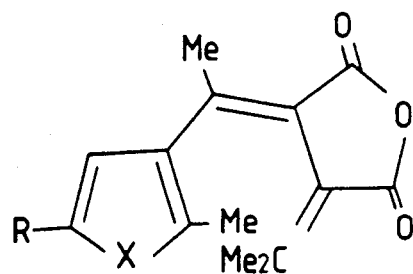
FIG. 5(A) shows the molecular structure of fulgide compound and FIG. 5(B) shows the molecular structure of fulgide compound when a laser beam having a sufficient intensity is applied thereto.
Figure 5B:
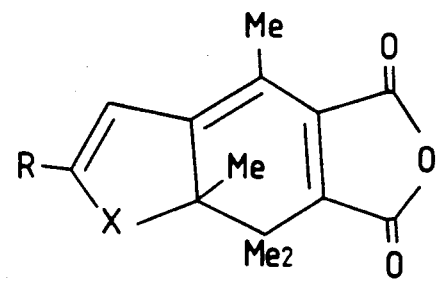
Figure 6:
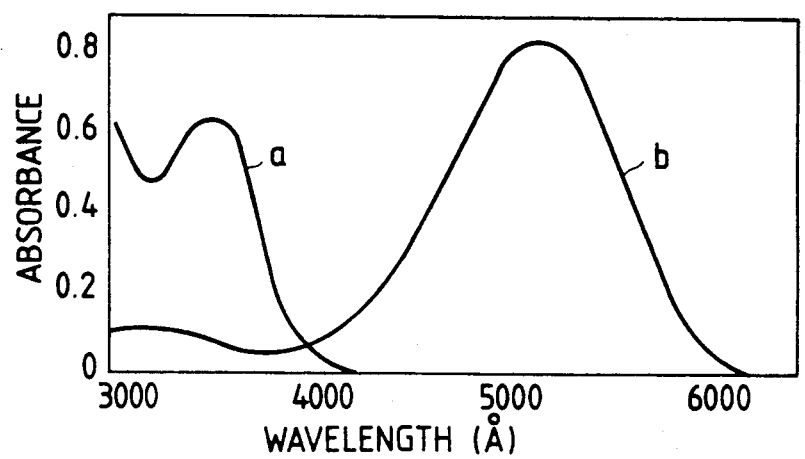
FIG. 6 shows the change of a absorption spectrum of the fulgide compound before and after applying the laser beam to the fulgide compound.

In the optical disk of this embodiment, information can be recorded in and reproduced from the flat layer 14 as well as the magnetooptic recording layer. When the fulgide compound is used for the flat layer, the information is recorded in and reproduced from the flat layer with a Ar laser having a wavelength of 5140 Å. The fulgide compound has originally a chemical structure as shown in FIG. 5(A), however, this structure is changed to a different structure as shown in FIG. 5(B) with irradiation of the Ar laser beam having sufficient light intensity. In accordance with the change in chemical structure of the fulgide compound, an absorption spectrum of the fulgide compound is changed from a waveform of (a) to another waveform (b) as shown in FIG. 6. As is apparent from FIG. 6, the absorption spectrum of the flat layer is provided with an absorption peak at the wavelength about 5000 Å by a photochromic reaction, which is caused by irradiation of the laser beam.

Accordingly, the recording of the information in the flat layer 14" is performed by irradiating the Ar laser beam whose light intensity is sufficient to change the chemical structure of the fulgide compound to thereby shift the peak of the absorption spectrum of the flat layer to 5000 Å at those portions of the flat layer where the laser beam is applied. Further, the reproduction of the information from the flat layer 14" is performed by irradiating the Ar laser beam whose light intensity is too weak to change the chemical structure of the fulgide compound. In this case, since the Ar laser beam has a wavelength of 5140 Å, a laser beam reflected from the flat layer 14" is reduced in light intensity at those portions of the flat layer where the chemical structure has been changed (that is, the information is recorded) because those portions sufficiently absorp the laser beam applied thereto. Accordingly, the recorded information can be reproduced from the flat layer by detecting the change of the light intensity of the reflected laser beam.

The fulgide compound is transparent to a laser beam having a wavelength above 6000 Å, particularly a wavelength of 8300 Å for recording in and reproduction from the magnetooptic recording layer, and therefore has no effect on the recording in and reproduction from the magnetooptic recording layer.

Since the magnetooptic recording layer 14" is designed so that the Curie temperature thereof is higher, the magnetization of the magnetooptic recording layer is prevented from being inverted during the recording of the information in the flat layer 14". Accordingly, the information can be independently recorded in and reproduced from the magnetooptic recording layer and the flat layer. This enables the memory capacity of the optical disk to be increased to two times that of the conventional optical disk.

Figure 7A:
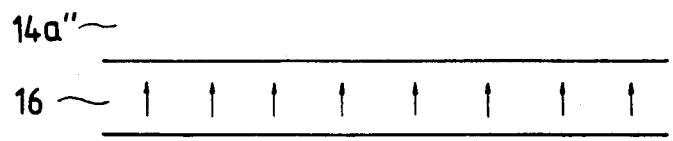
FIG. 7 is a diagram for explaining the method for recording the information in both a flat layer and a recording layer of the optical disk as shown in FIG. 4.
Figure 7B:
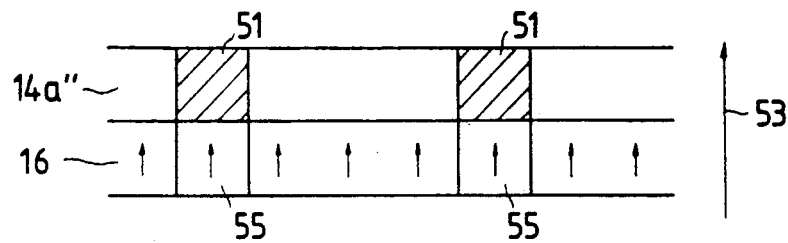
Figure 7C:
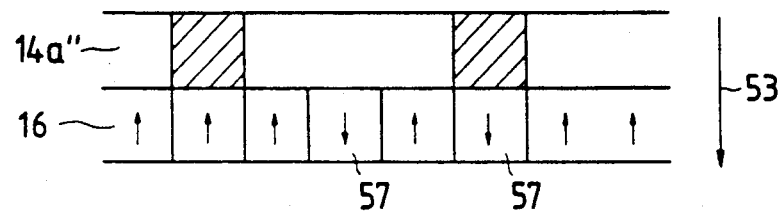

When a recording sensitivity of the magnetooptic recording layer is higher than that of the flat layer 14", the information is recorded in and reproduced from the optical disk in accordance with a process as shown in FIGS. 7(A) to 7(C).

At a first stage, the first layer 14a" of the flat layer 14" is transparent and the magnetooptic recording layer is uniformly upwardly magnetized over the layer as shown in FIG. 7(A) (that is, the magnetization of the magnetooptic recording medium is uniformly upwardly oriented). At a second stage, a laser beam having a sufficiently large light intensity is applied to the optical disk, whereby the light absorption is made larger at the irradiated portion of the first layer 14a" of the flat layer 14" and the recording of the information in the flat layer 14" is performed. In this process, an external magnetic field 53 is applied to the optical disk in the degaussing(demagnetization) direction, that is, in the upward direction in the drawing, so that the magnetization direction of the irradiated portion of the magnetooptic recording layer 16 is not changed (that is, the information is not recorded in the magnetooptic recording layer). At a third stage, a laser beam having a weaker light intensity than the laser beam for recording the information in the flat layer 14" is applied to the optical disk and the external magnetic field is applied downwardly in the drawing, so that the magnetization direction in the irradiated portion of the magnetooptic recording layer is inverted without affection on the flat layer 14" and the information is recorded only in the magnetooptic recording layer 16.

When the flat layer 14a" comprises an organic pigment such as spiropyran whose absorption spectrum is changed with irradiation of a laser beam having the wavelength for recording in and reproducing from the magnetooptic recording layer 16, the method for recording the information in the optical disk as shown in FIGS. 7(A) to 7(C) is applicable to the optical disk including the flat layer of spiropyran.

When the information is reproduced from the magnetooptic recording layer by detecting a reflected light from the magnetooptic recording layer, the change of intensity of the reflected light from the magnetooptic recording layer which is caused by the change of absorption of the flat layer 14a" can be canceled by detecting the reflected light with a well-known differential method. Accordingly, the information corresponding to only the change of the Kerr rotation angle due to the change of magnetization direction, that is, only the information recorded in the magnetooptic recording layer is obtained. Further, when the information is reproduced from the flat layer 14a" by detecting the reflected light from the flat layer 14a", the change of intensity of the reflected light which is caused by the rotation of the polarization plane of the reflected light due to the change of the magnetization direction in the magnetooptic recording layer can be canceled by detecting the reflected light without passing the reflected light through a polarizer or an analyzer. Accordingly, the information corresponding to only the change of absorption of the flat layer, that is, the information recorded in the flat layer 14a" is obtained.

As described above, the methods for detecting the reflected lights from the magnetooptic recording layer and the flat layer are different from each other and are not influenced by each other, so that an excellent reproduction characteristic having lower cross talk is obtained.

Like the first embodiment, in the process for producing the magnetooptic disk of this third embodiment, the second layer 14b" of the flat layer 14", the protection layer 18 and the magnetooptical recording layer 16 sandwiched between the second layer 14b" and the protective layer 18 are successively formed without taking the magnetooptic disk out of the vacuum chamber every each layer is formed, so that the chemical change of the magnetooptic recording layer 16 is sufficiently prevented and the magnetooptic disk having the magnetooptic recording layer is efficiently produced.

Further, the material for the flat layer is not limited to the materials as described above insofar as it is an organic pigment.

Still further, the recording layer 16 comprises a magnetooptic material in this embodiment. However, it is not limited thereto. For example, a phase-change material, a pit-formable material or an organic pigment may be used for the recording layer.

Still further, the same modifications to the base plate, the protection layer, the reflection layer and the method for producing the optical disk as made in the first embodiment may be made to this embodiment.

In the above third embodiment, the memory capacity of the optical disk is increased by utilizing recordable materials such as a magnetooptic material, a phase-change material, a pit-formable material and an organic material for forming each of the recording layer and the flat layer. From this point of view, the memory capacity of the optical disk can be further increased by utilizing the recordable materials for forming the other layers than the recording layer and the flat layer.

Figure 1:
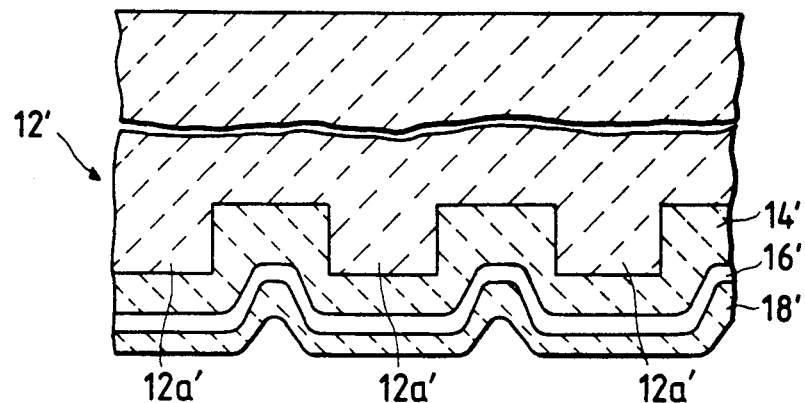
FIG. 1 is a cross sectional view a conventional optical disk.
Figure 8:
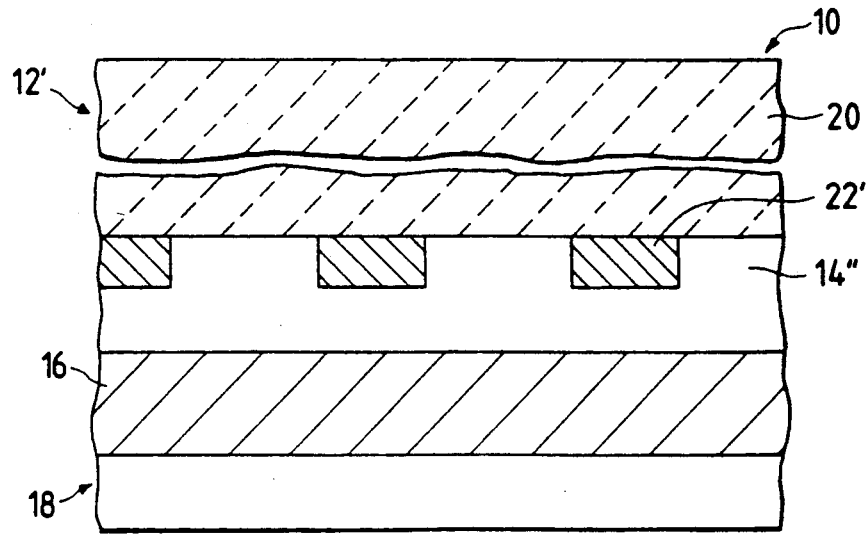
FIG. 8 is a cross sectional view of a fourth embodiment of the optical disk according to this invention.

FIG. 8 is a cross sectional view of a fourth embodiment of the optical disk according to this invention in which a recordable material is also used for a reflection layer for defining tracks. In this embodiment, the recordable material for the reflection layer comprises a phase-change material having a suitable reflectivity, however, it is not limited thereto. For example, the reflection layer may comprise a magnetooptic material, an organic pigment or the like. The same elements of the optical disk as those in FIGS. 1 and 4 are designated by the same reference numerals.

The basic structure of the optical disk according to this fourth embodiment is substantially similar to that of the third embodiment. That is, the optical disk of this embodiment includes a base plate 12' comprising a glass plate 20 and a reflection layer 22', a flat layer 14" comprising an organic pigment, a recording layer 16 comprising a magnetooptic material and a protection layer 18 which are laminated in this order.

Like the first to third embodiments, the reflection layer 22' is fixedly provided on the glass plate 20 in a spiral or coaxial form. However, the reflection layer 22' of this embodiment is formed of a recordable material such as a phase-variation type recording medium of metal or metal compound film.

FIGS. 9(A) to 9(F) are schematic diagrams for explaining a method for producing the disk base plate 12' used in the optical disk as shown in FIG. 8.

Figure 9A:
FIGS. 9(A) to 9(E) are diagrams for explaining a process for producing a disk base plate used in the optical disk as shown in FIG. 8.
Figure 9B:
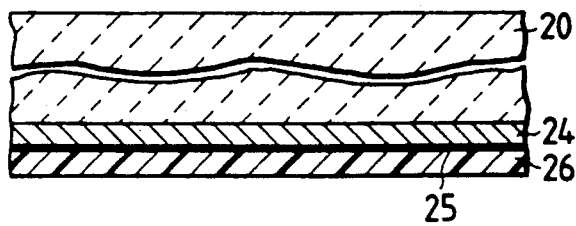
Figure 9C:
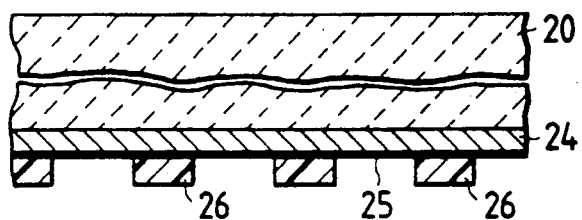
Figure 9D:
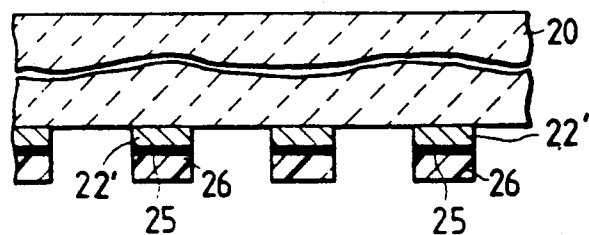
Figure 9E:
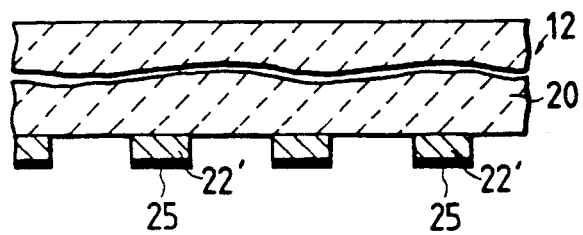

At a first stage, a flat glass plate 20 as shown in FIG. 9(A) is prepared, and on one surface of the glass plate 20, the metal or metal compound film 24 constituting the reflection layer 22' and an intermediate layer 25 are formed by the sputtering method, the vacuum deposition method or the like. The intermediate layer 25 serves to protect the reflection layer and is provided as occasion demands. Thereafter, a photoresist 26 is coated on the intermediate layer 25 as shown in FIG. 9(B). At a second stage, the photoresist 26 is spirally or coaxially removed by a laser exposure method or the like as shown in FIG. 9(C), and then is subjected to an etching treatment to remove the metal or metal compound film and the intermediate layer 25 as shown in FIG. 9(D). As a result, a part of the metal or metal compound film 24 remains as the reflection layer 22' on the glass plate 20. At a final stage, the photoresist 26 on the remaining metal or metal compound film 24 is removed to form a base plate 12 as shown in FIG. 9(E). The reflection layer 22' comprising the remaining metal or metal compound film 24 serves to define tracks for recording information with irradiation of a laser beam passed through the glass plate 20.

The flat layer 14", which comprises the organic pigment as described in the third embodiment, is formed on the base plate 12' in the same manner as in the third embodiment, that is, by the spin coating method. In this embodiment, a second layer 14b" of the flat layer is not shown as formed but may be formed on the flat layer 14" of this embodiment.

Further, the magnetooptic recording layer 16 and the protection layer of this embodiment are formed in the same processes as the third embodiment and the method for recording in and reproducing from the magnetooptic recording layer and the flat layer is substantially similar to that of the third embodiment. Therefore the detailed descriptions of these methods are omitted.

The reflection layer 22' is formed by sputtering or vacuum-depositing a metal compound such as TeOx or an alloy thin film of Ge-Se-Te. When a laser beam is applied to the reflection layer 22', the reflection layer 22' is changed from a crystalline state to an amorphous state and the reflectivity thereof is decreased, whereby pits are formed in the reflection layer 22'. The recording of information in the reflection layer 22' is performed by forming those pits in the reflection layer 22' and the reproduction of the information therefrom is performed by detecting the decrease of the reflectivity in the irradiated portion of the reflection layer 22'.

When the information is reproduced from the magnetooptic recording layer 16 with irradiation of the laser beam, the change of intensity of a reflected light from the magneooptic recording layer 16 can be canceled by detecting the reflected light with the differential method, so that the information corresponding to only the change of the Kerr rotation angle, that is, only the information recorded in the magnetooptic recording layer is obtained. Further, when the information is reproduced from the reflection layer 22' with irradiation of the laser beam, the information is reproduced by detecting the change of intensity of the reflected light. In this case, the intensity of the reflected light is changed in accordance with not only the change of the reflectivity of the irradiated portion of the reflection layer 22', but also the rotation of the polarization plane of the reflected light due to the change of the magnetization direction in the magnetooptic recording layer. However, the influence of the magnetooptic recording layer on the reflected light can be removed by detecting the reflected light without passing the reflected light through a polarizer or an analyzer. Accordingly, the information corresponding to only the change in reflectivity of the reflection layer 22', that is, the information recorded in the reflection layer 22' is obtained. As described above, the methods for reproducing the information from the magnetooptic recording layer 16 and the reflection layer 22' are different from each other and therefore are not influenced by each other. As a result, an excellent reproduction characteristic having lower cross talk can be obtained.

The recording in and reproduction from the magnetooptic recording layer 16 and the reflection layer 22' are performed with irradiation of a laser beam having a wavelength of 7800 Å or 8300 Å. As described in the third embodiment, when the fulgide compound is used for the flat layer 14", the flat layer 14" is transparent to the laser beam used for the recording in and reproduction from the magnetooptic recording layer 16 and the reflection layer 22' as shown in FIG. 6, so that it has no affection on the recording in and reproduction from the magnetooptic recording layer 16 and the reflection layer 22'.

By selecting suitable materials for the magnetooptic recording layer having a high Curie temperature and the reflection layer 22' having a high melting point, the inversion of the magnetization direction of the magnetooptic recording layer 16 and the change to the amorphous state in the reflection layer 22' can be prevented even when the information is recorded in the flat layer 14". Accordingly, the information can be independently recorded in and reproduced from the magnetooptic recording layer 16, the flat layer 14" and the reflection layer 22'. This enables the memory capacity of the optical disk according to this embodiment to be increased three times as much as the conventional optical disk.

When the reflection layer 22' comprises a phase-variation type recording medium in which information is recorded by the phase-variation from an amorphous state to a crystalline state in the reflection layer 22', the crystallization of the reflection layer 22' during the recording of the information in the flat layer 14" can be prevented by increasing the crystallization temperature of the reflection layer 22'.

When the recording sensitivity of the magnetooptic recording layer 16 is higher than that of the flat layer 14" and when spiropyran is used for the flat layer 14", the recording in and reproduction from the magnetooptic recording layer and the flat layer 14" are performed in the same manner as shown in FIGS. 7(A) to 7(C).

In this embodiment, each of the flat layer 14" and the protection layer 18 comprises a single layer. However, as described in the first embodiment, those layers may comprise two or more layers.

Further, in this embodiment, the reflection layer 22' comprises the phase-variation type metal compound. However, a pit-formable material of metal or an organic pigment such as spiropyran, a fulgide compound or the like may be used for the reflection layer 22'.

Still further, in this embodiment both of the flat layer and the reflection layer have a recordable property therein, however, at least one of them may be recordable. That is, only the reflection layer may comprise a recordable material while the flat layer comprises unrecordable material as used in the first and second embodiments.

Still further, the same modifications to the disk base, the protection layer and the method for producing the optical disk as made in the first to third embodiments may be made to this embodiment.

Figure 10:
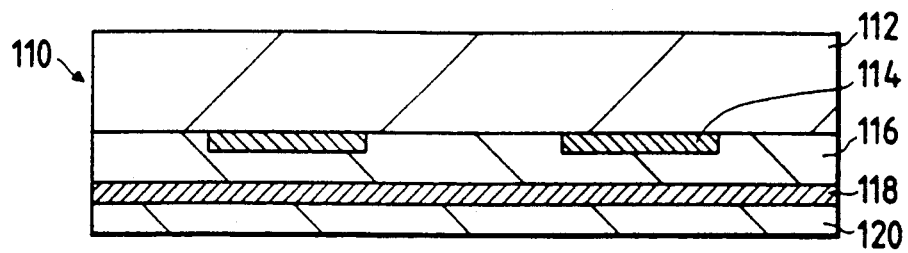
FIG. 10 is a cross sectional view of a fifth embodiment of the optical disk according to this invention.

FIG. 10 is a cross sectional view of a fifth embodiment of the optical disk according to this invention.

As shown in FIG. 10, the optical disk 110 of this embodiment has substantially the same structure as that of the first embodiment, and comprises a glass base plate 112 and a reflection layer 114 fixedly provided on the glass plate 112 in the spiral or coaxial form, a flat layer 116, a recording layer 118 and a protection layer 120 which are laminated in this order. In this embodiment, a magnetooptic material is used for the recording layer and each of the flat layer and the protection layer comprises a single layer. Further, the processes for forming the base plate, the recording layer and the protection layer are substantially similar to that of the first embodiment, and therefore the detailed descriptions for those elements and the processes for producing them are eliminated.

The flat layer 116 is formed on the base plate by the spin coating method in which liquefied metal alkoxide including Ti, Zr or the like is coated on the reflection layer 114 while the disk base plate is rotated with the reflection layer placed face up, and then is solidified by a bake of high temperature. In this method, gaps between strips of the reflection layer 114 are filled with the material of the flat layer 116, and the surface of the flat layer 116 which is positioned at the opposite side to the base plate becomes substantially flat irrespective of the irregularity of the the base plate due to the reflection layer 114. In this embodiment, any material is selected for the flat layer 116 so that the index of refraction of the flat layer 116 is larger than that of the glass base plate 112. For example, the index of refraction of the flat layer 116 is 2.0 when the flat layer 116 is formed of $ZrO_2$, and it is 2.7 when it is formed of $TiO_2$.

Further, like the first to fourth embodiments, the protection layer 120 is used to protect the recording layer (magnetooptic recording layer) 120 from the chemical change. The protection layer 120 comprises SiO, $SiO_2$, AlN or the like and is formed on the recording layer 118 by the sputtering or vacuum deposition method. The protection layer 120 may be formed of the same material as the flat layer 116.

In the optical disk thus constructed, the recording of information in the magnetooptic recording layer 118 is performed by locally heating the recording layer 118 to increase the temperature of the heated portion of the recording layer 118 to a Curie point (temperature) or a compensation temperature with irradiation of a laser beam and by adjusting the direction of an external magnetic field to be applied to the recording layer 118 and orienting the magnetization direction in the heated portion to a desired direction when the heated portion of the recording layer 118 is cooled, thereby to record the information corresponding to the magnetization direction in the recording layer 118. Further, the reproduction of the information from the recording layer 118 is performed by applying a laser beam through the base plate 12 to the recording layer 118 in which the information is recorded. In this case, the Kerr rotation angle of the laser beam reflected from the magnetooptic recording layer 118 is changed in accordance with the local change of the magnetization direction due to a magnetooptic effect, and the information recorded in the recording layer 118 is read out by detecting the change of the Kerr rotation angle.

Figure 11:
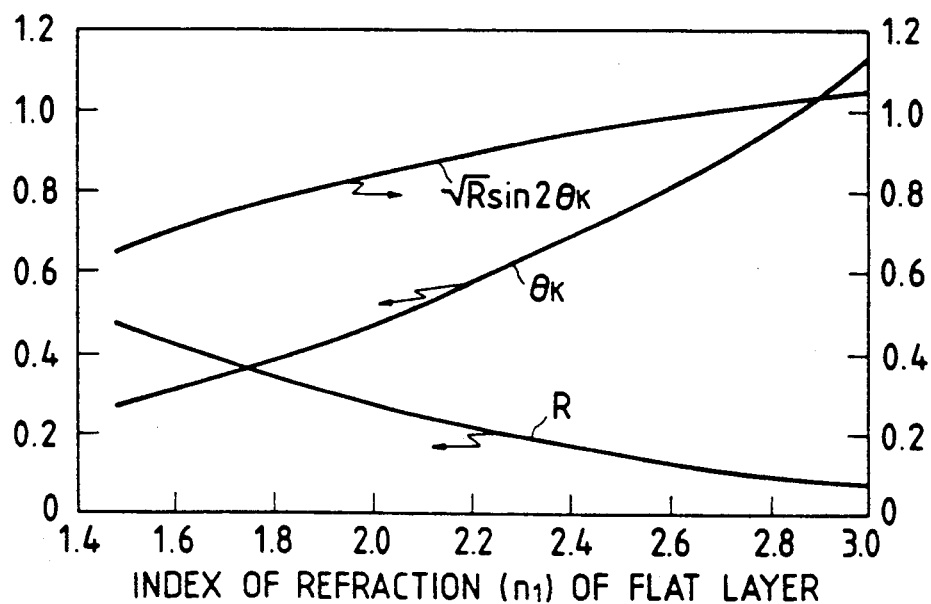
FIG. 11 shows reproduction characteristics of the optical disk as shown in FIG. 10.

FIG. 11 is a graph for showing reproduction characteristics such as reflectivity and Kerr rotation angle of the optical disk as shown in FIG. 10.

The graph of FIG. 11 shows the changes of the reflectivity (R) of the optical disk, the Kerr rotation angle ($\theta_K$) of the reflected light from the optical disk and the value ($\sqrt{R} \sin 2 \theta_K$) proportional to an signal output with respect to the index of refraction ($n_1$) in the following conditions: the index of refraction of the glass plate 112 is 1.46, the index of refraction ($n_2$) of the recording layer 118 is equal to $(2.24 - j3.18)$ where j represents imaginary unit, the thickness of the recording layer is 1000 Å, the index of the refraction and the thickness of the protection layer are equal to those of the flat layer, the thickness of the flat layer 116 is $\lambda/8$ for providing the optimum tracking operation and the tensor of the dielectric constant ($\epsilon$) of the recording layer is represented by the following equation (1) where g is equal to $(0.016 - j0.00114)$.

$$(\epsilon) = n_2 \cdot \begin{pmatrix} 1 & -jg & 0 \\ jg & 1 & 0 \\ 0 & 0 & 0 \end{pmatrix} \quad (1)$$

As is apparent from FIG. 11, even though the Kerr effect is remarkable (the Kerr rotation angle is large), an sufficient output signal ($\sqrt{R} \cdot \sin 2 \theta_K$) is not obtained when the reflectivity is very small, so that a signal-to-noise ratio (S/N) is reduced. Accordingly, in order to obtain the maximum signal-to-noise ratio (S/N), the optical disk is designed so that the value of $\sqrt{R} \cdot \sin 2 \theta_K$ is maximum. The thickness of the flat layer 116 is not set to a wavelength of $\lambda/4$ for providing the maximum anti-reflection effect, but is set to $\lambda/8$ for providing the optimum tracking operation, so that the remarkable reduction of the reflectivity as shown in FIG. 11 does not occur. Accordingly, as the refractivity of the flat layer 116 is large, an interference effect is larger and the value of $\sqrt{R} \cdot \sin 2 \theta_K$ (the output signal) is increased. That is, the S/N is more increased as the refractivity of the flat layer 116 is larger.

In the optical disk as shown in FIG. 10, the tracking operation is carried out by the push-pull method utilizing diffracted lights from the reflection layer 114. In this case, the reflectivity of the reflection layer 114 for the tracking operation is not influenced by the refractivity and thickness of the flat layer 116 because the reflection layer 114 is formed on the glass plate 112. This enables the optical disk of this embodiment to solve a disadvantage of the conventional optical disk including a base plate having grooves thereon. That is, the lowering of the reflectivity of the base plate in the conventional optical disk, which is caused by the Kerr effect enhancement, is prevented in the optical disk 110 of this embodiment. Accordingly, in this embodiment, a tracking signal having large amplitude can be obtained and therefore a stable tracking characteristic can be obtained.

Any modifications may be made to the optical disk of this embodiment as described in the first to fourth embodiments, and some examples thereof will be described hereunder.

Figure 12:
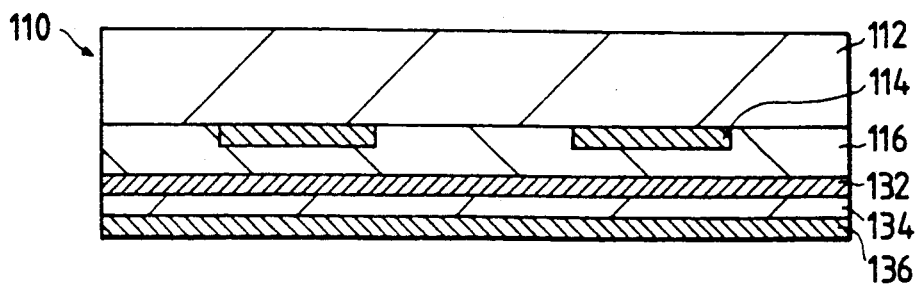
FIG. 12 is a cross sectional view of a modification to the optical disk of the fifth embodiment.

FIG. 12 shows a modification of the optical disk of this embodiment. As shown in FIG. 12, it is possible to make a recording layer 132 thinner and form a reflection layer 136 on a protection layer 134. In the optical disk having the above structure, an incident light to the base plate is passed through the recording layer 132 comprising a magnetic thin film to the reflection layer 136, and thereafter the reflected light from the reflection layer 136 is passed through the recording layer 132 again. This enables the optical disk of this embodiment to have not only the Kerr effect, but also the Faraday effect, so that a larger Kerr effect enhancement is obtained. In this case, the reflectivity of the reflection layer 114 is not lowered and therefore a stable tracking characteristic is obtained.

Further, in this embodiment as described above each of the flat layer 116 and the protection layer 120 comprises a single layer, but may comprise plural laminated layers.

Figure 13:
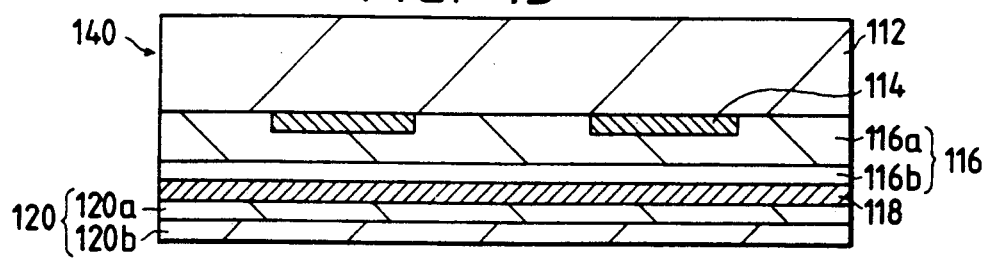
FIG. 13 is a cross sectional view of a further modification to the optical disk of the fifth embodiment.

FIG. 13 shows another modification of the optical disk in which each of the flat layer and the protection layer comprises two layers. As shown in FIG. 13, a first layer 116a of the flat layer 116 is formed on the base plate by the spin coating method, and then a second layer 116b thereof is formed on the first layer 116a by the sputtering method, the vacuum deposition method or other methods. Further, a first layer 120a of the protection layer 120 is formed on the recording layer 116 by the sputtering method, the vacuum deposition method or the other methods, and then a second layer 120b of the protection layer 120 is formed on the first layer 120a by the spin coating method. These processes are described in the first to fourth embodiments and the detailed descriptions thereof are eliminated. As described in the first to fourth embodiments, the second layer 116b of the flat layer 116, the recording layer 118 and the first layer 120a of the protection layer 120 can be successively formed in a vacuum chamber, so that the oxidation of the recording layer 118 is sufficiently prevented and the manufacturing of an optical disk 140 is efficiently performed. The second layer 120b of the protection layer 120 may be eliminated.

The other modifications as described in the first to fourth embodiments may be made to the optical disk of this embodiment. For example, the glass plate may be substituted by a synthetic resin such as acrylic resin, polycarbonate resin, polyolefin resin, epoxy resin or the like. Further, the magnetooptic recording layer may be substituted by a pit-formable recording layer comprises Te, Bi or the like, or a phase-variation type recording layer comprises TeOx or the like.

The materials and thicknesses of the reflection layer for the tracking operation, the flat layer and the protection layer may be suitably modified. For example, the reflection layer may comprise a metal compound, a material having low reflectivity or the like.

Further, the tracking method is not limited to the push-pull method, but may be the three-beam method or the like.

In the first to fifth embodiments, the various methods such as the push-pull method, the three-beam method and so on are utilized for the tracking servo. For example, the push-pull method utilizes one laser beam for recording and reproducing information. When the laser beam is positioned at the center of a track for recording information, a diffraction pattern of the laser beam diffracted by a tracking projection or groove on the base plate is symmetrical with respect to the central line of the track. Accordingly, when a two-segmental photodiode is used for detection of the diffraction pattern, the difference between output signals from the two-segmental photodiode is substantially zero. On the other hand, when the laser beam is deviated from the center of the track to the right or left side, the diffracted pattern is asymmetrical with respect to the center line of the track and therefore the difference between the output signals from the two-segmental photodiode is positive or negative. Accordingly, the tracking servo is performed by feedback-controlling the position of the laser beam so that the difference between the output signals is constantly zero. However, it is difficult to accurately carry out the tracking servo operation by the push-pull method because the intensity of a diffracted light is small and the tracking operation itself is liable to be influenced by an outside influence such as vibration or the like.

The above disadvantage can be overcome by using a material having large absorption coefficient for the reflection layer.

Figure 14:
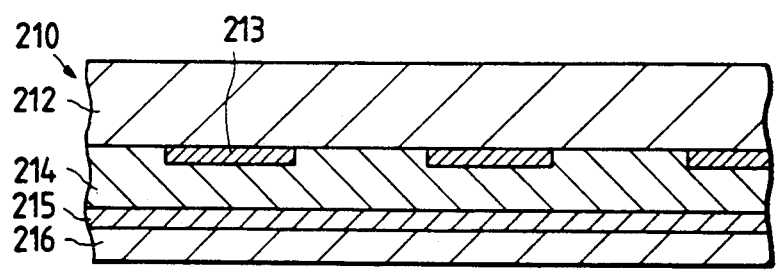
FIG. 14 is a cross sectional view of a sixth embodiment of the optical disk according to this embodiment.

FIG. 14 is a cross sectional view of sixth embodiment of the optical disk of this invention in which the above disadvantage is overcome.

The optical disk of this embodiment has the substantially same structure of the first to fifth embodiments as described above, except for the reflection layer. In this embodiment, the reflection layer comprises a material having large absorption coefficient such as carbon (C) or the like, and therefore it is hereunder referred to as "a tracking guide layer". The optical disk of this embodiment comprises a base plate 212, a guide layer 213 for the tracking servo, a flat layer 214, a recording layer 215 and a protection layer 216 which are laminated in this order.

The tracking guide layer 213 is fixedly provided on a transparent plate 212 of glass or the like in a spiral or coaxial form. The process for forming the tracking guide layer 213 on the plate 212 will be described hereunder with reference to FIG. 15.

Figure 15A:
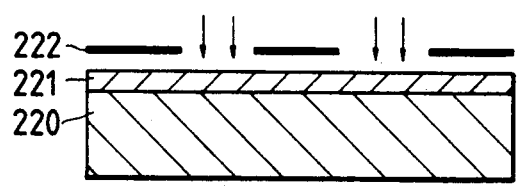
FIGS. 15(A) to 15(F) are diagrams for explaining a process for producing the optical disk as shown in FIG. 14.
Figure 15B:
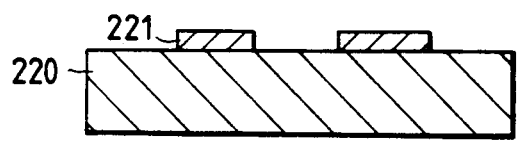
Figure 15C:
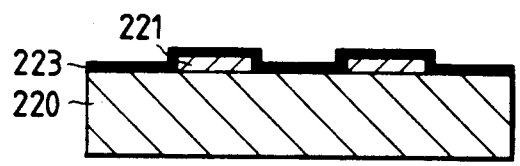
Figure 15D:
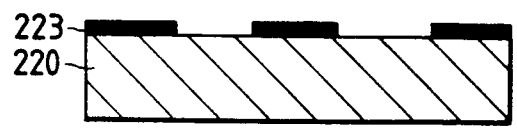
Figure 15E:
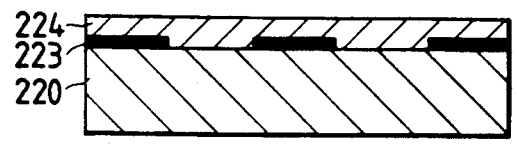
Figure 15F:
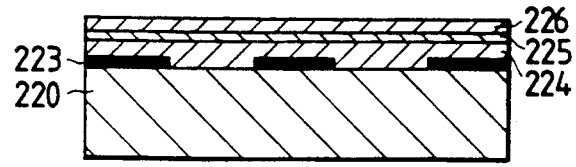

At a first stage, photoresist 220 is coated on the flat glass plate 221 by the spin coating method, and then is exposed to light through a mask having a spiral or coaxial form 222 as shown in FIG. 15(A), or by a laser exposing method. At a second stage, the exposed photoresist is developed and the unexposed portion thereof is removed from the plate 220, so that only the exposed photoresist 221 remains on the plate 220 in the spiral or coaxial form as shown in FIG. 15(B). At a third stage, a thin film 223 of the material having large absorption coefficient such as carbon or the like is formed on the remaining photoresist 221 and the plate 220 by the sputtering method, the vacuum deposition method or the like as shown in FIG. 15(C). At a fourth stage, the remaining photoresist 221 is removed using an organic solvent such as acetone or the like, so that a part of the thin film 223 remains as a tracking guide layer on the plate 220 as shown in FIG. 15(D). The tracking guide layer 223 is used for defining tracks on which information is recorded. The tracking guide layer 223 may be formed on the plate 220 by first forming thin film 223 of the material having large absorption coefficient such as carbon or the like on the plate 220, secondly coating the photoresist on the thin film and finally forming the tracking guide layer 223 by a photolithograph technique. At a fifth stage, the flat layer 224 comprising a chemically-stable and transparent oxide such as $SiO_2$ or the like is formed on the tracking guide layer 223 and the plate 220 by the spin coating method in which liquefied metal alkoxide such as silicon alkoxide is supplied on the tracking guide layer 223 and the plate 220 while the plate 220 is rotated with the tracking guide layer 223 placed face up, and then the metal alkoxide is solidified into $SiO_2$ or the like. In this process, gaps between the tracking guide layers 223 are filled with the flat layer 224 and the surface of the flat layer is substantially flat as shown in FIG. 15(E). At a sixth stage, the recording layer 225 and the protection layer 226 are formed on the flat layer 224 by the sputtering method, the vacuum deposition method or the like as shown in FIG. 15(F).

A material such as Te, TeOx or the like may be used for an optical recording layer, a phase-variation type recording layer or the like, and a material such as TbFeCo or the like may be used for a magnetooptic recording layer. Further, similar to the first to fifth embodiments, the flat layer 224 is formed so that it has the substantially flat surface, so that the recording layer 225 has the substantially uniform thickness and the substantially flat surface over the layer.

Further, similar to the first to fifth embodiments, the protection layer 226 is used to protect the recording layer 225 from chemical change, heighten the Kerr effect of a magnetic thin film used for the magnetooptic recording layer and adjusting the reflectivity to improve the recording sensitivity, and comprises a chemically-stable and transparent oxide such as $SiO_2$ like the flat layer 224. The protection layer 226 is formed by the sputtering method, the vacuum deposition method, the CVD method or the spin coating method.

Figure 16:
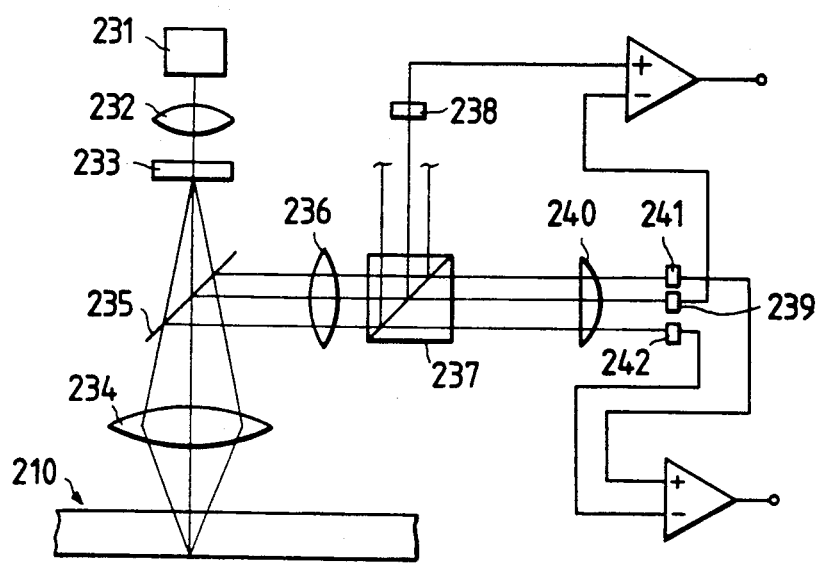
FIG. 16 shows the optical arrangement of a tracking servo system.
Figure 18:
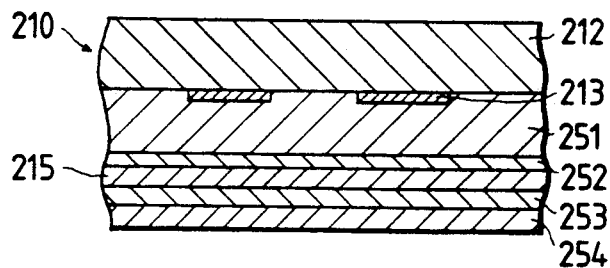
FIG. 18 is a cross sectional view of a modification to the optical disk as shown in FIG. 14.

FIG. 16 is a schemmatic diagram showing an optical arrangement of a tracking servo system such as an optical head for performing the tracking servo operation for the optical disk according to this embodiment. A laser beam emitted from a laser source 231 is collimated by a lens 232, and the collimated beam is applied to a grating 233 to be split into three beams by a grating 233, one of which is a main beam positioned at the center and the other beams of which are subbeams positioned at both sides of the main beam. Those beams are focused on an optical disk 210 including a recording layer such as a magnetooptic recording layer comprising a magnetic thin film, phase-variation type recording layer comprising a phase-change material or the like. The beams reflected from the optical disk 210 are reflected from a half mirror 235 and passed through a lens 236 to a polarizing beam splitter 237 for separating an incident beam into two polarizing components whose polarizing directions are vertical to each other. The main beam reflected from the optical disk has two polarizing components because the polarization plane is rotated in accordance with the change of the magnetization direction (that is, information recorded in the recording layer), and is split into two main beams having the recorded information by the polarizing beam splitter 237. Those main beams are converted into electrical signals by photodetectors 238 and 239, respectively and applied to a differential amplifier. The recorded information is reproduced by the well-known difference method. One of the main beams is applied through a cylindrical lens 240 to the four-segmental photodiode 239. On the basis of output signals from the photodiode 239, a focusing operation is performed by an astigmatic method. The two subbeams are detected by photodiodes 241 and 242.

Figure 17:
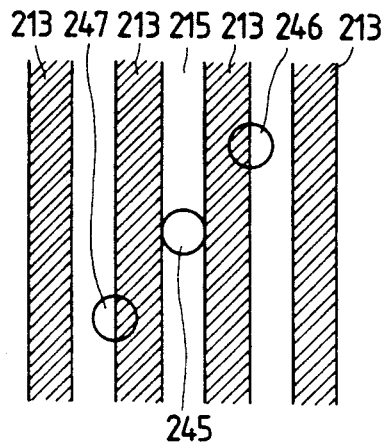
FIG. 17 is a diagram for explaining a tracking servo operation of the optical disk as shown in FIG. 14.

FIG. 17 shows the arrangement of beam spots on the optical disk as shown FIG. 14. The main beam as shown in FIG. 16 is applied to the recording layer 215 and the subbeams 246 and 247 are applied to the tracking guide layers 213 in such a manner that a half spot of each subbeam covers each of the tracking guide layers 213. When the main beam 245 is accurately positioned in a gap between the neighboring tracking guide layers 213 (that is, a tracking is rightly operated), the light intensities of the subbeams 246 and 247 are equal to each other and the difference between the output signals from the photodetectors 241 and 242 as shown in FIG. 16 is zero. When the main beam is deviated to the right side, the subbeam 247 is also deviated to the tracking guide layer 213. Since the tracking guide layer 213 comprises a material having large absorption coefficient, the intensity of the subbeam 247 reflected from the tracking guide layer 213 becomes smaller, while the intensity of the subbeam 246 reflected from the tracking guide layer 213 becomes larger. Accordingly, when the subbeams 246 and 247 reflected from the tracking guide layers 213 are detected by the photodiodes 241 and 242, the difference between the output signals of the photodiodes 241 and 242 is positive. On the other hand, when the main beam is deviated to the left side (that is, the subbeam 246 is deviated to the tracking guide layer 213 and the subbeam 247 is deviated away from the tracking guide layer 213), the intensity of the reflected subbeam 246 becomes smaller, while the intensity of the reflected subbeam 247 becomes larger. Accordingly, the difference between the output signals of the photodiodes 241 and 242 is negative. As described above, the difference between the output signals of the photodiodes 241 and 242 is changed in accordance with the deviation of the main beam. Accordingly, the tracking operation is performed by moving the objective lens 234 so that the difference is zero. The movement of the objective lens 234 is controlled by an actuator (not shown).

In the optical disk of this embodiment, the tracking guide layer 213 has a large absorption coefficient, so that the light intensities of the reflected subbeams are largely changed in accordance with the deviation of the main beam in comparison with the conventional optical disk in which the light intensity of the beam is changed with interference between the diffracted beams from the projections or grooves on the optical disk. Accordingly, in this embodiment a stable tracking servo is performed with high sensitivity.

When information is recorded or erased in the optical disk having a magnetic recording layer, the intensity of the main beam is increased to heat the magnetic recording layer to the Curie temperature and an external magnetic field is applied to orient the magnetization direction to a desired direction.

In the optical disk of this embodiment, the recording layer has a substantially uniform thickness and a substantially flat surface like the first to fifth embodiments. Therefore, the optical disk of this embodiment also has the advantages as obtained in the first to fifth embodiments. For example, in the conventional optical disk having tracking guide layers comprising projections or grooves on the base plate, oxidation is liable to occur in the stepped portions of the recording layer which are formed in accordance with the projections or grooves. However, the recording layer of this embodiment has the substantially flat surface and therefore the oxidation hardly occurs in the recording layer, so that the reliability of the optical disk is heightened. Further, nonuniformity in the shape of bits (elements constituting information in the recording layer, for example, pits) due to the irregularity of the surface of the base plate can be prevented. Accordingly, a noise due to nonuniformity of the bit shape is prevented and a signal-to-noise ratio (S/N) is increased. Further, in the conventional disk having a magnetic recording layer, the recording layer has the uneven surface whose sectional profile corresponds to that of the uneven surface of the base plate, so that an uniform perpendicular magnetic anisotropy is not obtained and a recording characteristic is degraded. However, in this embodiment, an uniform perpendicular magnetic anisotropy for providing a stable recording characteristic is obtained because the recording layer has the substantially uniform thickness and the substantially flat surface, so that the recording characteristic is sufficiently improved.

In this embodiment, each of the flat layer 214 and the protection layer 216 comprises a single layer. However, each layer may comprise plural layers.

Further, carbon for constituting the tracking guide layer 213 may be substituted by an oxide such as $Fe_2O_3$, $Ta_2O_5$ or the like. At any rate, any material may be used for the tracking guide layer 213 insofar as it has a large absorption coefficient.

Still further, in this embodiment, a laser beam is applied through the base plate 212 to the recording layer 215. However, this embodiment can be applied to another type optical disk in which the laser beam is applied from the opposite side to the base plate to the recording layer. In this case, the optical disk comprises a base plate, a protection layer for protecting a recording layer from chemical change, the recording layer and another protection layer which corresponds to the flat layer and serves to protect the recording layer from the chemical change, extinguish a reflected light from the recording layer to improve a recording sensitivity and increase a Kerr rotation angle of a reflected light from the recording layer when the recording layer comprises a magnetic layer, which are laminated in this order. Tracking guide layers for defining tracks are formed on the protection layer which is provided on the recording layer.

Still further, a laser beam may be applied to the tracking guide layer to form pits on the tracking guide layer. The tracking guide layer has a large reflectivity at the portion on which the pits are formed.

Any other modifications as described in the first to fifth embodiments may be made to the optical disk and the method for producing the optical disk according to this embodiment.

When a card type recording medium is adopted, the tracking guide layers are formed in a strip, spiral or coaxial form.

The foregoing description to the first to sixth embodiments is made particularly for a case where an optical disk in which a laser beam is applied through a base plate is used. However, as described above, this invention is applicable to another type optical disk in which the laser beam is applied from the opposite side to the base plate.

Figure 19:
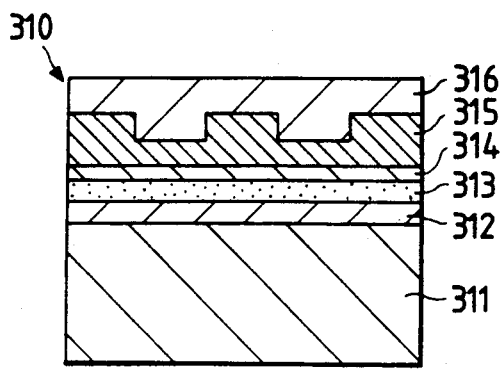
FIG. 19 is a cross sectional view of a seventh embodiment of the optical disk according to this invention.

FIG. 19 is a cross sectional view of an optical disk of this invention in which a laser beam is applied from the opposite side to a base plate.

The optical disk 310 of this embodiment as shown in FIG. 19 includes a base plate 311 comprising glass, synthetic resin such as acrylic resin or polycarbonate resin, metal such as Al, ceramic material or the like, a protection layer 312 comprising $SiO_2$, SiO, AlN or the like, a recording layer 313 comprising metal such as Te, TeOx or TbFeCo, a phase-change material, a magnetooptic material, pigment, or the like, a protection layer 314, light absorption resin layer 315 and a protection layer 316 comprising a transparent resin. The base plate 311 can be formed of not only a transparent material such as glass or resin, but also a opaque material such as metal or ceramic material because the laser beam is not applied through the base plate 311, but is applied from the opposite side to the base plate 311. Particularly, the optical disk including the base plate of ceramic material is light in weight and is rotatable at a high speed. Further, the optical disk is hardly transformed and therefore it is stable.

The recording layer 313 and the protection layers 312 and 314 sandwiching the recording layer 313 are formed by a well-known thin film forming method such as the sputtering method, the vacuum deposition method or the like. The protection layers 312 and 314 are not necessarily required. One or both of the protection layers may be eliminated.

The base plate 311 has a flat surface and therefore the recording layer 313 also has a flat surface. In the first to sixth embodiments, a flat layer is required for making the surface of a recording layer substantially flat because the uneven surface of the base plate causes the surface of the recording layer to be uneven. However, in this embodiment, the flat layer is not required because the surface of the base plate is originally substantially flat. Accordingly, the recording layer 313 of this embodiment has a substantially uniform thickness and a substantially flat surface over the layer, so that an uniform recording characteristic is obtained over the recording layer, the deterioration of the recording layer is prevented and a reliability of the optical disk is increased. Further, nonuniformity in the shape of bits (elements constituting information in the recording layer, for example, pits) due to the irregularity of the surface of the base plate can be prevented. Accordingly, a noise due to the nonuniformity of the bit shape is prevented and a signal to-noise ratio (S/N) is increased.

Figure 20A:
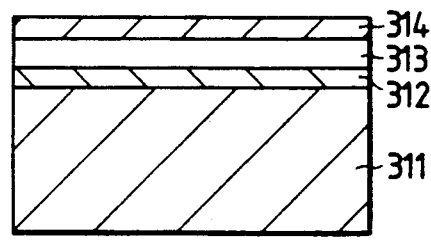
FIGS. 20(A) to 20(C) are diagrams for explaining a method for producing a light absorption layer having projections and the grooves thereon which is used in the optical disk as shown in FIG. 19.
Figure 20B:
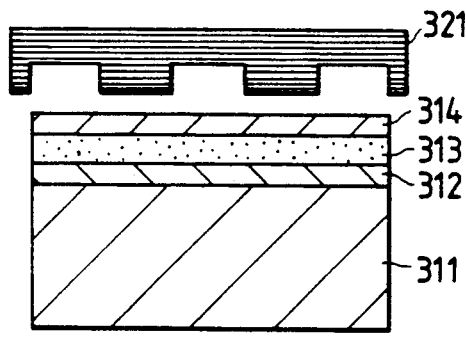
Figure 20C:
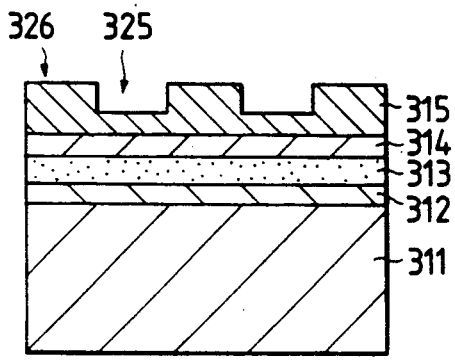

The light absorption resin layer 315 having tracking guide grooves is formed by a process as shown in FIGS. 20(A) to 20(C).

At a first stage, the protection layer 312, the recording layer 313 and the protection layer 314 are laminated on the base plate 311 in this order as shown in FIG. 20(A). At a second stage, as shown in FIG. 20(B), a metal stamper 321 having grooves formed spirally or coaxially thereon is disposed in the neighboring of the base plate on which the recording layer 313 and the protection layers 312 and 314 are formed. Thereafter, a light absorption resin is filled in a gap between the metal stamper and the base plate and then is cooled, whereby an injection molding is performed. The light absorption resin layer 315 having the guide grooves 325 as shown in FIG. 20(C) is obtained by removing the stamper 321.

Since the thickness of the grooves 325 of the light absorption resin layer 315 is thin, the greater part of an incident laser beam to the grooves 325 is not absorbed by the grooves and passes therethrough to the recording layer 313. The reflected laser beam from the recording layer 313 is not attenuated in the grooves and therefore the greater part of the reflected laser beam is detected by an optical head. On the other hand, since the thickness of projections 326 of the light absorption resin layer 315 is thicker than the grooves 325, the incident laser beam to the projections 326 is mostly absorbed by the light absorption resin layer 315 in a process where the incident laser beam is applied through the projections 326 to the recording layer 313 and then is reflected from the recording layer 313 through the projections 326 to an outside of the optical disk, so that the intensity of the laser beam reflected from the optical disk is small. That is, the laser beam applied to the grooves 325 of the light absorption resin layer 315 is reflected from the optical disk with small attenuation, so that the intensity of the reflected laser beam from the grooves is large. On the other hand, the laser beam applied to the projections 326 of the light absorption resin layer 315 is reflected from the optical disk with large attenuation, so that the intensity of the reflected laser beam from the projections is small. As a result, there occurs a difference in light intensity between the reflected laser beams from the grooves 325 and the projections 326 of the light absorption resin layer 315. This difference is used for performing a tracking servo of the optical disk.

Figure 21:
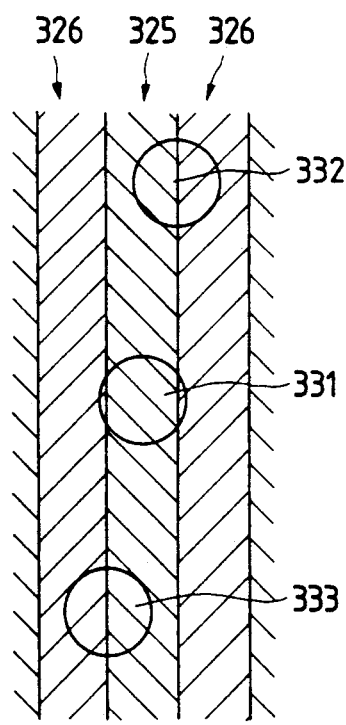
FIG. 21 is a diagram for explaining a tracking servo operation for the optical disk as shown in FIG. 19.

FIG. 21 is an explanatory diagram for explaining the tracking servo by a three-beam method. The tracking servo system used in this embodiment is substantially similar to that shown in FIG. 16, and therefore the detailed description thereof is eliminated.

A main beam 331 used for recording and reproducing information is applied to the grooves 325 of the light absorption resin layer 315 and subbeams 332 and 333 are applied to the boundaries between the grooves 325 and the projections 326 in such a manner that the center line of each subbeam is disposed at each boundary. When the main beam 331 is accurately positioned at the center of the groove (that is, a tracking is rightly operated), the light intensities of the subbeams 332 and 333 are equal to each other. When the main beam is deviated to the right side, the subbeam 332 is also deviated to the projection 326. Since the projection absorbs most of the incident laser beam, the intensity of the subbeam 332 reflected from the projection 326 becomes smaller, while the intensity of the subbeam 333 reflected from the groove 325 becomes larger. Accordingly, when the subbeams 332 and 333 reflected from the groove 325 and the projection 326 are detected by photodiodes, the difference between output signals of the photodiodes is positive. On the other hand, when the main beam is deviated to the left side (that is, the subbeam 332 is deviated to the groove 325 and the subbeam 333 is deviated to the projection 326, the intensity of the reflected subbeam 333 becomes smaller, while the intensity of the reflected subbeam 332 becomes larger. Accordingly, the difference between the output signals of the photodiodes is negative. As described above, the difference between the output signals of the photodiodes is changed in accordance with the deviation of the main beam, so that the tracking operation is performed by obtaining a difference between the reflected laser beams from the grooves and the projections and obtaining a tracking error signal.

Figure 22A:
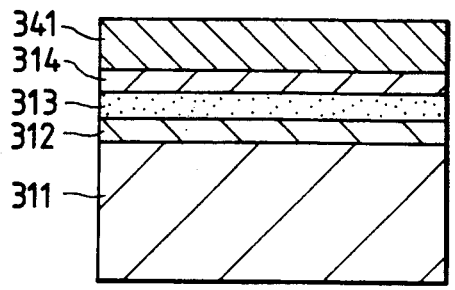
FIGS. 22(A) to 22(C) are diagrams for explaining another method for producing the light absorption layer having the projections and the grooves.
Figure 22C:
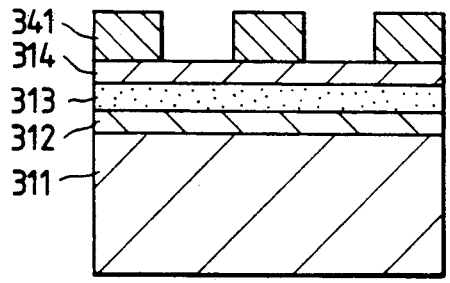
Figure 23:
FIG. 23 is a cross sectional view of the light absorption layer in which U-shaped grooves are formed.

The light absorption resin layer 315 comprises a transparent resin such as acrylic resin, epoxy resin or an ultraviolet photosetting resin which contains pigment absorbing the incident laser beam thereto. In place of the pigment, particles of carbon, metal or the like may be dispersed in the transparent resin. When the ultraviolet photosetting resin is used, the resin which has been filled in the gap between the stamper and the base plate is exposed to ultraviolet light to photocure the resin. In place of using the stamper, the ultraviolet photosetting resin or a photoresist 341 is coated on the protection layer 314 as shown in FIG. 22(A), and then an ultraviolet light is applied to the ultraviolet photosetting resin or the photoresist 341 through a mask 345 having the pattern corresponding to the pattern of grooves to be formed, thereby photocuring the irradiated portion of the ultraviolet photosetting resin or the photoresist 341 and forming the grooves as shown in FIG. 22(C). In this case, the bottom of each groove may be eliminated as shown in FIG. 22(C). Further, the groove is not necessarily designed in a rectangular form in section. For example, it may be designed in a U-shaped form in section as shown in FIG. 23.

The thickness of the projections of the light absorption resin layer may be freely determined insofar as each of the projections sufficiently absorbs the incident light in comparison with the grooves.

The transparent protection layer 316 is formed on the light absorption resin layer 315 by the spin coating method, the injection molding method or the like. The material and thickness of the transparent protection layer 316 may be freely determined. Further, the protection layer 316 is not necessarily required, and may be eliminated.

Any modifications may be made to the optical disk having the structure as described above. For example, the modifications as shown in FIGS. 24 to 26 may be made to the optical disk as shown in FIG. 19.

Figure 24:
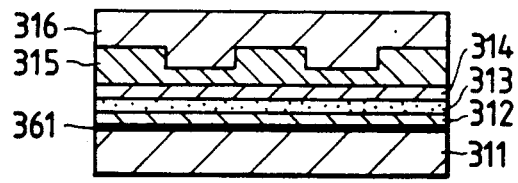
FIG. 24 is a cross sectional view of a modification of the optical disk as shown in FIG. 19.
Figure 22B:
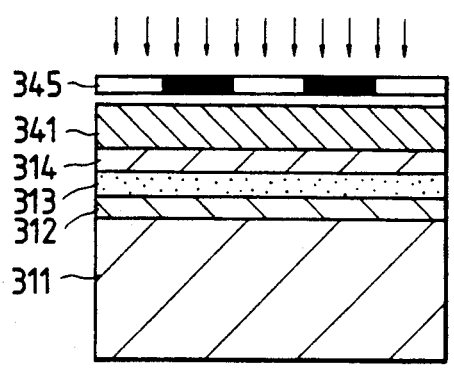

A reflection layer 361 of Al or the like may be formed between the base plate 311 and the protection layer 312 as shown in FIG. 24. In this case, the recording layer 313 is designed so that it is thin to the extent that an incident laser beam is passed therethrough, or comprises a material having a high light-transmissivity such as magnetic garnet. When the base plate 311 comprises a metal plate of Al or the like, the reflection layer 361 may be eliminated.

Figure 25:
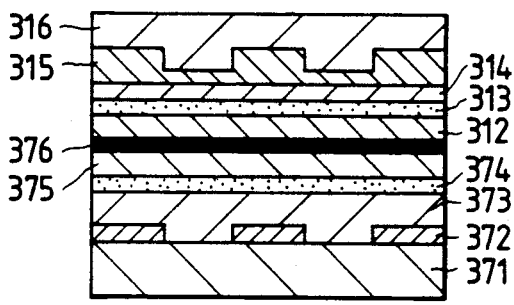
FIG. 25 is a cross sectional view of a modification of the optical disk as shown in FIG. 24.

As shown in FIG. 25, a tracking guide layer 372 of Ta, Al or the like, a flat layer 373 of $SiO_2$ or the like, a recording layer 374 of Te, FeOx, TbFeCo or the like and a protection layer 375 of $SiO_2$ or the like are successively laminated on a base plate 371 of glass or the like. Further, a reflection layer of Al or a light absorption layer 376, a protection layer 312, as recording layer 313, a protection layer 314, a light absorption resin layer 315 and a transparent protection layer 316 are successively formed on the protection layer 375. The optical disk thus constructed can be recorded and reproduced by irradiating a laser beam from the both sides of the base plate and the light absorption resin layer.

Figure 26:
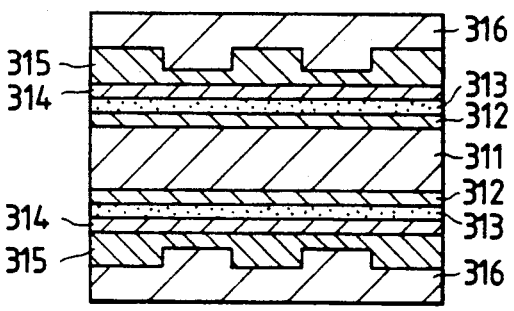
FIG. 26 is a cross sectional view of another modification of the optical disk as shown in FIG. 24.

Further, as shown in FIG. 26, the recording layer 313, the light absorption resin layer and so on are formed on both sides of the base plate 311, so that information is recorded and reproduced at both sides of the optical disk. This structure of the optical disk can eliminate a requirement for sticking two optical disks to each other, and can provide a thin optical disk having a high recording density.

The optical disk is not necessarily designed in a disk form, but in a card form. In this case, the grooves of the light absorption resin layer may be designed in a strip, spiral or coaxial form.

Any other modifications as described in the first to sixth embodiments may be made to the optical disk of this embodiment.

What is claimed is:

1. An optical recording medium for recording information therein and reproducing the information therefrom with irradiation of light thereto, comprising:
   a base plate;
   a tracking guide member formed on a surface of said base plate and having an uneven surface for generating a tracking signal;
   a flat layer covering said uneven surface of said tracking guide member and having a substantially flat surface at the opposite side to said base plate for smoothing said uneven surface on said base plate; and
   a recording layer formed on said flat layer and having a substantially uniform thickness and a substantially flat surface.

2. An optical recording medium as claimed in claim 1, further comprising a protection layer formed on said recording layer for protecting said recording layer from chemical change.

3. An optical recording medium as claimed in claim 1, wherein said recording layer comprises any material selected from the group consisting of a magnetooptic material, a phase-change material, an organic pigment and a pit-formable material in which the information is recordable.

4. An optical recording medium as claimed in claim 3, wherein said magnetooptic material comprises an amorphous alloy of TbFeCo or GdTbFe.

5. An optical recording medium as claimed in claim 3, wherein said phase-change material comprises any material selected from the group consisting of In-Se and TeOx.

6. An optical recording medium as claimed in claim 3, wherein said organic material comprises any material selected from the group consisting of spiropyran and fulgide compound.

7. An optical recording medium as claimed in claim 3, wherein said pit-formable material comprises any material selected from the group consisting of Te and Bi.

8. An optical recording medium as claimed in claim 1, wherein said base plate comprises any material selected from the group consisting of glass, acrylic resin, polycarbonate resin, and polyolefin resin.

9. An optical recording medium as claimed in claim 1, wherein said uneven surface of said tracking guide member defines tracks for said optical recording medium.

10. An optical recording medium as claimed in claim 9, wherein said tracking guide layer is formed on said base plate in a spiral or coaxial form.

11. An optical recording medium as claimed in claim 9, wherein said tracking guide layer is a reflection layer serving to reflect the irradiated light therefrom.

12. An optical recording medium as claimed in claim 11, wherein said reflection layer comprises any material selected from the group consisting of metal and nitride.

13. An optical recording medium as claimed in claim 11, wherein said reflection layer comprises a recordable and reproducible material.

14. An optical recording medium as claimed in claim 13, wherein said recordable and reproducible material comprises any material of selected from the group consisting of a magnetooptic material, a phase-change material, an organic pigment and a metal alloy in which the information is recordable.

15. An optical recording medium as claimed in claim 9, wherein said tracking guide layer is a light absorption layer having an coefficient sufficient to absorb the irradiated light.

16. An optical recording medium as claimed in claim 15, wherein said light absorption layer comprises any material selected from the group consisting of carbon, $Fe_2O_3$ and $Ta_2O_3$.

17. An optical recording layer as claimed in claim 1, wherein said flat layer serves to protect said recording layer from chemical change and comprises an oxide.

18. An optical recording layer as claimed in claim 17, wherein said oxide comprises any material selected from the group consisting of $SiO_2$, $ZrO_2$ and $TiO_2$.

19. An optical recording layer as claimed in claim 1, wherein said flat layer comprises a recordable and reproducible material and serves to record and reproduce an information independently of said recording layer.

20. An optical recording layer as claimed in claim 19, wherein said recordable and reproducible material comprises an organic pigment.

21. An optical recording layer as claimed in claim 20, wherein said organic pigment comprises any material selected from the group consisting of spiropyran and fulgide compound.

22. An optical recording layer as claimed in claim 21, wherein said flat layer further comprises a layer formed on said recordable and reproducible material, said layer comprises any material selected from the group consisting of $SiO_2$, SiO and AlN.

23. An optical recording layer as claimed in claim 1, further comprising a protection layer for protecting said recording layer from chemical change.

24. An optical recording layer as claimed in claim 23, wherein said protection layer comprises at least one layer comprising any material selected from the group consisting of $SiO_2$, SiO and AlN.

25. An optical recording medium for recording information therein and reproducing the information therefrom with irradiation of light thereto, comprising:
   a base plate having a substantially flat surface;
   a recording layer formed on said base plate and having a substantially uniform thickness and a substantially flat surface; and
   a light absorption layer formed on said recording layer and comprising projections for absorbing the irradiated light therein and grooves for passing the irradiated light therethrough, said projections and said grooves defining tracks for recording the information.

26. An optical recording medium as claimed in claim 25, wherein said base plate comprises any material selected from the group consisting of glass, a transparent synthetic resin, metal and a ceramic material.

27. An optical recording medium as claimed in claim 26, wherein said synthetic resin comprises any material selected from the group consisting of glass, acrylic resin, polycarbonate resin and polyolefin resin.

28. An optical recording medium as claimed in claim 25, wherein said light absorption layer comprises a material selected from the group consisting of $Fe_2O_3$, $Ta_2O_3$, and resin or an ultraviolet photosetting resin containing pigment absorbing the irradiated light, carbon and metal particles.

29. An optical recording medium as claimed in claim 25, wherein said recording layer comprises any material selected from the group consisting of a magnetooptic material, a phase-change material, an organic pigment and a pit-formable material in which the information is recordable.

30. An optical recording medium as claimed in claim 29, wherein said magnetooptic material comprises an amorphous alloy of TbFeCo or GdTbFe.

31. An optical recording medium as claimed in claim 29, wherein said phase-change material comprises any material selected from the group consisting of In-Se and TeOx.

32. An optical recording medium as claimed in claim 29, wherein said organic material comprises any material selected from the group consisting of spiropyran and fulgide compound.

33. An optical recording medium as claimed in claim 29, wherein said pit-formable material comprises any material selected from the group consisting of Te and Bi.

34. An optical recording medium as claimed in claim 25, further comprising a protection layer formed on at least one of both surfaces of said recording layer for protecting said recording layer from chemical change.

35. An optical recording medium as claimed in claim 34, wherein said protection comprises any material selected from the group consisting of $SiO_2$, SiO and AlN.

36. An optical recording medium as claimed in claim 25, further comprising a protection layer formed on said light absorption layer.

37. An optical recording medium as claimed in claim 36, wherein said protection layer comprises a transparent resin.

38. An optical recording medium as claimed in claim 25, further comprising a reflection layer formed on said base plate for reflecting the irradiated light.

39. An optical recording medium as claimed in claim 38, wherein said reflection layer comprises Al.

40. An optical recording medium for recording information therein and reproducing the information therefrom with irradiation of light, comprising:
a base plate;
a tracking guide layer formed on a surface of said base plate and having an uneven surface for generating a tracking signal;
a flat layer covering said uneven surface of said tracking guide layer and having a substantially uniform thickness and a substantially flat surface at the opposite side to said base plate;
a first recording layer formed on said flat layer and having a substantially uniform thickness and a substantially flat surface;
a first protection layer formed on said recording layer for protecting said recording layer from chemical change;
one of a reflection layer and a light absorption layer formed on said protection layer;
a second recording layer formed on said one of a reflection layer and a light absorption layer;
a light absorption layer having thereon projections for absorbing the irradiated light and grooves which pass the irradiated light therethrough for defining tracks for recording the information; and
a transparent protection layer formed on said light absorption layer.

41. An optical recording medium as claimed in claim 40, further comprising a second protection layer formed on at least one of both surfaces of said recording layer.

42. An optical recording medium for recording information therein and reproducing the information therefrom with irradiation of light thereto, comprising:
a base plate having a substantially flat surface;
first and second recording layers formed on both surfaces of said base layer, each having a substantially uniform thickness and a substantially flat surface;
first and second light absorption layers formed on said recording layers respectively, each comprising projections for absorbing the irradiated light therein and grooves for passing the irradiated light therethrough, said projections and said grooves defining tracks for recording the information; and
first and second transparent protection layers formed on said first and second light absorption layers respectively.

43. An optical recording medium as claimed in claim 42, further comprising a third protection layer formed on at least one of both surfaces of each of said first and second recording layers.

44. An optical recording medium as claimed in claim 43, wherein said third protection layer comprises any material selected from the group consisting of $SiO_2$, SiO and AlN.

45. An optical recording medium as claimed in claim 9, wherein said uneven surface includes grooves formed on the surface of said base plate.

46. An optical recording medium as claimed in claim 1, wherein said tracking guide member comprises a layer provided on the surface of said base plate and having an uneven surface defining tracks for said optical recording medium.

47. An optical recording medium as claimed in claim 25, wherein said light absorption layer has no recording capability with light or heat.

48. An optical recording medium as claimed in claim 42, wherein said light absorption layers have no recording capability with light or heat.

* * * * *